(12) United States Patent
Jun

(10) Patent No.: US 11,696,055 B2
(45) Date of Patent: Jul. 4, 2023

(54) ANALOG-TO-DIGITAL CONVERTER FOR SEPARATELY APPLYING A BIAS VOLTAGE DEPENDING ON AN OPERATION MODE, AND AN IMAGE SENSOR INCLUDING THE SAME

(71) Applicant: SAMSUNG ELECTRONICS CO., LTD., Suwon-si (KR)

(72) Inventor: Jaehoon Jun, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/579,722

(22) Filed: Jan. 20, 2022

(65) Prior Publication Data

US 2022/0345657 A1 Oct. 27, 2022

(30) Foreign Application Priority Data

Apr. 26, 2021 (KR) .................. 10-2021-0053755

(51) Int. Cl.
*H04N 5/374* (2011.01)
*H04N 25/772* (2023.01)
*H04N 25/677* (2023.01)
*H04N 25/709* (2023.01)
*H04N 25/71* (2023.01)

(52) U.S. Cl.
CPC ......... *H04N 25/772* (2023.01); *H04N 25/677* (2023.01); *H04N 25/709* (2023.01); *H04N 25/745* (2023.01)

(58) Field of Classification Search
CPC ............ H04N 5/37455; H04N 5/3658; H04N 5/3698; H04N 5/3765
See application file for complete search history.

(56) References Cited

U.S. PATENT DOCUMENTS

| | | | |
|---|---|---|---|
| 9,767,760 | B2 | 9/2017 | Takahashi |
| 10,567,686 | B2 | 2/2020 | Tanaka |
| 10,785,423 | B2 | 9/2020 | Ikedo |
| 10,819,936 | B2 | 10/2020 | Ebihara et al. |
| 10,827,143 | B2 | 11/2020 | Ebihara |
| 2015/0021460 | A1 | 1/2015 | Matsuda |
| 2019/0253650 | A1* | 8/2019 | Kim .............. H04N 9/045 |
| 2020/0127035 | A1 | 4/2020 | Oseto et al. |

* cited by examiner

*Primary Examiner* — Yogesh K Aggarwal
(74) *Attorney, Agent, or Firm* — F. Chau & Associates, LLC

(57) ABSTRACT

An image sensor supporting a full resolution mode and a crop mode, the image sensor including: a pixel array including a plurality of pixels configured to generate a pixel signal by sensing an object; an analog-to-digital converter configured to convert the pixel signal into a digital signal and including a plurality of metal lines; a bias generator configured to apply a bias voltage to the plurality of metal lines; and a bias controller including: a first transistor configured to activate all of the plurality of metal lines based on a first control signal; and a second transistor configured to activate a first metal line for the crop mode among the plurality of metal lines based on a second control signal.

20 Claims, 15 Drawing Sheets

FIG. 6D

| MODE | SIGNALS | | | VOLTAGES | |
|---|---|---|---|---|---|
| | CS1 | CS2 | SS1 | ML1 | ML2 |
| FULL | L | L | H | $V_{BIAS}$ | $V_{BIAS}$ |
| CROP | L | H | L | $V_{BIAS}$ | $V_{SS}$ |
| PWROFF | H | H | D | $V_{SS}$ | $V_{SS}$ |
| | H | D | H | $V_{SS}$ | $V_{SS}$ |
| | D | H | H | $V_{SS}$ | $V_{SS}$ |

ANALOG-TO-DIGITAL CONVERTER FOR SEPARATELY APPLYING A BIAS VOLTAGE DEPENDING ON AN OPERATION MODE, AND AN IMAGE SENSOR INCLUDING THE SAME

CROSS-REFERENCE TO RELATED APPLICATION

This application claims priority under 35 U.S.C. § 119 to Korean Patent Application No. 10-2021-0053755, filed on Apr. 26, 2021, in the Korean Intellectual Property Office, the disclosure of which is incorporated by reference herein in its entirety.

TECHNICAL FIELD

The inventive concept relates to a complementary metal-oxide semiconductor (CMOS) image sensor, and more particularly, to an analog-to-digital converter that separately applies a bias voltage depending on an operation mode, and an image sensor including the same.

DISCUSSION OF RELATED ART

An image sensor is a sensor that detects and conveys information used to make an image. A complementary metal oxide semiconductor (CMOS) image sensor is one of two main types of electronic image sensors. In the CMOS image sensor, correlated double sampling (CDS) is used to remove pixel reset noise. To increase the performance of an image sensor, an analog-to-digital converter (ADC) may be used in conjunction with the CDS method.

The ADC may include a power-down switch to reduce power when the ADC is not used for sensing. However, the power-down switch may induce its own on-resistance and cause the input range of the amplifier to vary.

SUMMARY

An example embodiment of the inventive concept provides an image sensor that does not include a separate power-down switch by separately applying a bias voltage depending on an operation mode.

According to an example embodiment of the inventive concept, there is provided an image sensor supporting a full resolution mode and a crop mode, the image sensor including: a pixel array including a plurality of pixels configured to generate a pixel signal by sensing an object; an analog-to-digital converter configured to convert the pixel signal into a digital signal and including a plurality of metal lines; a bias generator configured to apply a bias voltage to the plurality of metal lines; and a bias controller including: a first transistor configured to activate all of the plurality of metal lines based on a first control signal; and a second transistor configured to activate a first metal line for the crop mode among the plurality of metal lines based on a second control signal.

According to an example embodiment of the inventive concept, there is provided an analog-to-digital converter configured to convert a pixel signal sensed at a pixel into a digital signal, the analog-to-digital converter including: a comparator including a first metal line and a second metal line that are activated depending on a bias voltage, the comparator being configured to generate a comparison signal by comparing the pixel signal with a ramp signal based on the bias voltage; a counter configured to generate a digital signal by counting the comparison signal based on a clock signal; and a first transistor and a second transistor configured to determine a path of the bias voltage applied to the first metal line and the second metal line.

According to an example embodiment of the inventive concept, there is provided an image sensor supporting a full resolution mode and a crop mode, the image sensor including: a pixel array including a plurality of pixels configured to generate a pixel signal by sensing an object; an analog-to-digital converting array including a plurality of analog-to-digital converters each configured to convert the pixel signal into a digital signal, the analog-to-digital converting array including a plurality of metal lines commonly connected to the plurality of analog-to-digital converters; a bias generator configured to apply a bias voltage to the plurality of metal lines; and a bias controller including a first transistor configured to activate all of the plurality of metal lines based on a first control signal; a second transistor configured to activate a first metal line for the crop mode among the plurality of metal lines based on a second control signal; and an output buffer configured to output the digital signal.

BRIEF DESCRIPTION OF THE DRAWINGS

Embodiments of the inventive concept will be more clearly understood from the following detailed description taken in conjunction with the accompanying drawings in which:

FIG. 6D is a table showing signal levels according to an operation mode of an analog-to-digital converter according to an example embodiment of the inventive concept;

DETAILED DESCRIPTION OF THE EMBODIMENTS

Hereinafter, example embodiments of the inventive concept will be described in detail with reference to the accompanying drawings.

Figure 1:
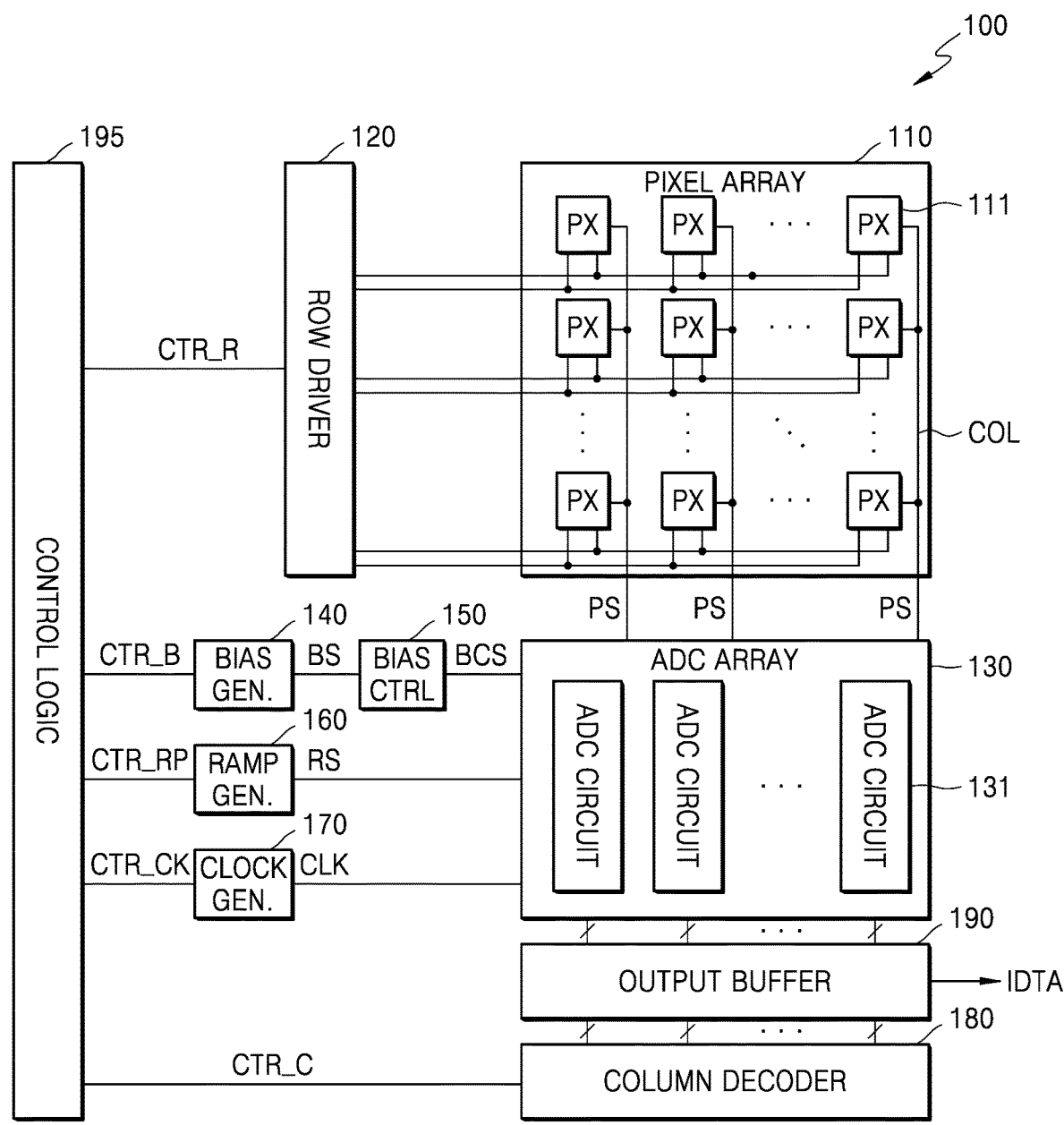
FIG. 1 is a block diagram illustrating an image sensor according to an example embodiment of the inventive concept.

FIG. 1 is a block diagram illustrating an image sensor 100 according to an example embodiment of the inventive concept.

Referring to FIG. 1, the image sensor 100 may be mounted on an electronic device capable of sensing an image or light. For example, the image sensor 100 may be mounted in an electronic device such as a camera, a smartphone, a wearable device, an internet of things (IoT) object, a tablet personal computer (PC), a personal digital assistant (PDA), a portable multimedia player (PMP), a navigation device, etc. In addition, the image sensor 100 may be mounted in an electronic device provided as a component in a vehicle, furniture, manufacturing equipment, a door, various measurement devices, and the like.

The image sensor 100 may convert an optical signal of an object incident through an optical lens into an electrical signal, and convert the electrical signal into image data IDTA. The image sensor 100 may include, for example, a pixel array 110 including a plurality of two-dimensionally arranged pixels and various electrical circuits for sensing. The image sensor 100 may be implemented as a semiconductor chip including the pixel array 110 and a sensing circuit.

The image sensor 100 may include the pixel array 110, a row driver 120, an analog-to-digital converting (ADC) array 130 including an analog-to-digital converter (hereinafter referred to as ADC) 131, a bias generator 140, a bias controller 150, a ramp generator 160, and a clock generator 170, a column decoder 180, an output buffer 190, and a control logic 195.

The pixel array 110 may convert received optical signals into electrical signals. The pixel array 110 may include a plurality of pixels 111 each connected to a plurality of row lines and a plurality of column lines COL and arranged in a matrix form. Each of the plurality of pixels 111 may include a photoelectric conversion element. For example, the pixel 111 may be implemented as a photoelectric conversion element such as a charge coupled device (CCD) or a complementary metal oxide semiconductor (CMOS), and may be implemented with various types of photoelectric conversion elements. For example, the photoelectric conversion element may include a photodiode, a phototransistor, a photogate, or a pinned photodiode. Each of the plurality of pixels 111 may include at least one photoelectric conversion element, and the plurality of photoelectric conversion elements may be stacked on each other.

The plurality of pixels 111 may sense light using a photoelectric conversion element and convert the sensed light into a pixel signal PS, which is an electrical signal. The pixel signal PS may include a reset signal generated based on a reset operation of each of the plurality of pixels 111, and may include an image signal based on a photo sensing operation of each of the plurality of pixels 111. In other words, the pixel signal PS may include both of the reset signal and the image signal.

Each of the plurality of pixels 111 may detect light in a specific spectrum range. For example, the plurality of pixels 111 may include red pixels for converting light in a red spectrum range into an electrical signal, green pixels for converting light in a green spectrum range into an electrical signal, and blue pixels for converting light in a blue spectrum range into an electrical signal. A color filter for transmitting light in a specific spectral range may be disposed on each of the plurality of pixels 111. As another example, the plurality of pixels 111 may include a cyan pixel, a yellow pixel, a magenta pixel, or a white pixel.

A micro lens and a color filter may be stacked on each of the plurality of pixels 111, and the plurality of color filters of the plurality of pixels 111 may constitute a color filter array. The color filter may transmit light of a specific color among light incident through the microlens, that is, a wavelength of a specific color region. A color detectable by the pixel 111 may be determined based on a color filter provided in the pixel 111. However, the inventive concept is not limited thereto, and in an embodiment, and in an embodiment, the photoelectric conversion element provided in the pixel 111 may convert light corresponding to the wavelength of the color region into an electric signal depending on the level of the applied electric signal, for example, the voltage level, and accordingly, a color detectable by the pixel 111 may be determined depending on the level of the electric signal applied to the photoelectric conversion element.

In an example embodiment, each of the plurality of pixels 111 may sense an object using at least two photoelectric conversion elements. For example, each of the plurality of pixels 111 may include at least one first photoelectric conversion element disposed in a left direction (or an upward direction) with respect to the optical axis of the micro lens and at least one second photoelectric conversion element disposed in a right direction (or a downward direction) with respect to the optical axis of the micro lens. Each of the plurality of pixels 111 may output a first image signal generated from the first photoelectric conversion element or a second image signal generated from the second photoelectric conversion element. One pixel 111 of two pixels 111 arranged in different adjacent rows and the same column may output the first image signal generated from the first photoelectric conversion element, and the other pixel 111 of the two pixels 111 may output the second image signal generated from the second photoelectric conversion element. In this case, the two pixels 111 may detect the same color. Based on the first image signal and the second image signal output from the two pixels 111, auto-focusing data used for a phase difference calculation for an auto-focusing function, for example, a phase detection signal pair, may be generated. In addition, the pixel 111 may output a sum image signal generated from the at least one first photoelectric conversion element and the at least one second photoelectric conversion element as the pixel signal PS. The sum image signal may be used to generate an image in units of frames.

The row driver 120 may drive the pixel array 110 in units of rows. The row driver 120 may decode a row control signal CTR_R generated by the control logic 195 and select at least one row line from among row lines constituting the pixel array 110 in response to the decoded row control signal. For example, the row control signal CTR_R may include an address signal or a command indicating address information. In an example embodiment of the inventive concept, the row driver 120 may generate a row select signal. The pixel array 110 may output the pixel signal PS from a row selected by the row select signal provided from the row driver 120 through a column line COL. In other words, the plurality of pixels 111 of the pixel array 110 may sequentially output pixel signals in row units.

The analog-to-digital converting array 130 may convert the pixel signal PS, which is an analog signal input from the pixel array 110, into a digital value. The analog-to-digital converting array 130 may include a plurality of ADCs 131 arranged in a column direction to process the pixel signal PS provided through the column line COL.

In an example embodiment of the inventive concept, the analog-to-digital converting array 130 may be referred to as a correlated double sampling circuit. The pixel signals PS output from the plurality of pixels 111 may have a deviation due to a characteristic of each pixel, for example, column fixed pattern noise (CFPN) and/or a deviation due to a difference in characteristics of logic for outputting the pixel signal from the pixel 111. To compensate for the deviation between these pixel signals PS, correlated double sampling involves: obtaining a reset component (or a reset signal) and an image component (or an image signal) for each of the pixel signals PS; and extracting the difference between the reset component and the image component as an effective signal component.

The analog-to-digital converting array 130 may receive a bias control signal BCS generated by the bias controller 150, a ramp signal RS generated by the ramp generator 160, and a counter clock signal CLK generated by the clock generator 170. The ADC 131 may convert the pixel signal PS, which is an analog signal, into a digital value based on the bias control signal BCS, the ramp signal RS, and the counter clock signal CLK.

According to an example embodiment of the inventive concept, the ADC 131 may activate at least some of the column lines COL based on the bias control signal BCS, and generate a comparison signal by comparing the pixel signal PS output from the pixel 111 connected to the activated column line COL with the ramp signal RS and amplifying the comparison result. According to an example embodiment of the inventive concept, the ADC 131 may convert the comparison signal into a digital signal based on the counter clock signal CLK. The ADC 131 will be described in more detail in FIG. 3.

The bias generator 140 may operate based on a bias control signal CTR_B provided from the control logic 195. The bias generator 140 may generate a bias voltage required to amplify the pixel signal PS and provide the generated bias voltage to the analog-to-digital converting array 130. The bias controller 150 may determine a path of the bias voltage provided to the analog-to-digital converting array 130. The bias voltage may be commonly required for the plurality of ADCs 131 depending on the operation mode, and the bias controller 150 may activate at least some of the plurality of column lines COL by determining a path such that a bias voltage is commonly provided to the plurality of ADCs 131 arranged in parallel.

The ramp generator 160 may operate based on a ramp control signal CTR_RP provided from the control logic 195. The ramp control signal CTR_RP may include a ramp enable signal. When the ramp enable signal is activated, the ramp generator 160 may generate a ramp signal RS having a slope. The ramp signal RS is a signal that gradually rises or falls with a constant magnitude. The ramp signal RS may include a reset ramping period for reset and a signal ramping period for sensing a signal. For example, when the ramp signal RS is used for correlated double sampling (CDS), the ramp signal RS may sequentially have a reset ramping period and a signal ramping period.

According to an example embodiment of the inventive concept, the ramp generator 160 may generate the ramp signal RS having a specific slope, a ramping time, a ramping start voltage level, and/or a ramping end voltage level in response to the ramp control signal CTR_RP. For example, the ramp generator 160 may generate a ramp signal decreasing with a constant slope, or may generate a reverse ramp signal increasing with a constant slope.

The clock generator 170 may operate based on a clock control signal CTR_CK provided from the control logic 195. The clock generator 170 may generate a counting clock signal CLK to be provided to the analog-to-digital converting array 130. The generation timing and frequency of the counting clock signal CLK may be controlled by the control logic 195. In an example embodiment of the inventive concept, the clock generator 170 may be implemented as a gray code generator. The clock generator 170 may generate a plurality of code values having a resolution depending on the number of bits set as the counting clock signal CLK. For example, when a 10-bit code is set, the clock generator 170 may generate the counting clock signal CLK including 1024 code values, and when an 11-bit code is set, the clock generator 170 may generate a counting clock signal CLK including 2048 code values.

The output buffer 190 may temporarily store the digital signal output from the analog-to-digital converting array 130, and then, sense the digital signal, amplify the sensed digital signal, and output the amplified digital signal. The output buffer 190 may further include a column memory and a sense amplifier. The column memory may temporarily store digital signals output from each of the plurality of ADCs 131 and output the digital signals to the sense amplifier, and the sense amplifier may sense and amplify digital signals output from the column memories. The sense amplifier may output the amplified digital signals as image data IDTA.

As mentioned above, the column memory is included in the output buffer 190, but the inventive concept is not limited thereto. For example, the column memory may be included in the analog-to-digital converting array 130 in the form of a latch. In addition, the column memory may be implemented as a static random access memory (SRAM), a latch, a flip-flop, or a combination thereof, but is not limited thereto.

The column decoder 180 may operate based on a column control signal CTR_C provided from the control logic 195. The column decoder 180 may control the output timing of the pixel value stored in the output buffer 190 depending on the column control signal CTR_C. The column decoder 180 may select a specific column line from among the plurality of column lines COL by decoding the column control signal CTR_C. The column decoder 180 may externally provide image data IDTA corresponding to the selected column line COL and temporarily stored in the memory of the output buffer 190.

The control logic 195 may control the image sensor 100 by generating various control signals. According to an example embodiment of the inventive concept, the control logic 195 may generate the row control signal CTR_R for controlling the row driver 120, the bias control signal CTR_B for controlling the bias generator 140, the ramp control signal CTR_RP for controlling the ramp generator 160, the clock control signal CTR_CK for controlling the clock generator 170, and the column control signal CTR_C for controlling the column decoder 180. For example, the control logic 195 may adjust an application time, an application rate, a slope, a start voltage level, and/or an end voltage level of a bias signal BS, the ramp signal RS, and the counter clock signal CLK by determining a timing, level, amplitude, duty ratio, and application time of the row control signal CTR_R, the bias control signal CTR_B, the ramp control signal CTR_RP, the clock control signal CTR_CK, and/or the column control signal CTR_C.

The control logic 195 may interpret an externally provided command and adjust various control signals, for example, the row control signal CTR_R, the bias control signal CTR_B, the ramp control signal CTR_RP, the clock control signal CTR_CK, and/or the column control signal CTR_C to correspond to the command. According to an example embodiment of the inventive concept, when the central processing unit (e.g., an application processor) of the electronic device including the image sensor 100 determines the operation mode of the image sensor 100, the control logic 195 may control functional units of the image sensor 100 to correspond to the determined operation mode. For example, the image sensor 100 may support a full resolution mode and a crop mode. In other words, the image sensor 100 may support a first mode and a second mode. When the application processor commands the operation mode to be changed to the crop mode, the control logic 195 may adjust the row control signal CTR_R, the bias control signal CTR_B, the ramp control signal CTR_RP, the clock control signal CTR_CK, and/or the column control signal CTR_C to correspond to the crop mode.

The control logic 195 may be implemented as a central processing unit (CPU), an arithmetic logic unit (ALU) that performs arithmetic and logical operations, bit shifters, and the like, a digital signal processor (DSP), a microprocessor, an application specific integrated circuit (ASIC), a control logic, or the like, but is not limited thereto. In some embodiments of the inventive concept, the control logic 195 may include a state machine composed of a plurality of logic gates, and may include a processor and a memory that stores instructions to be executed by the processor.

Figure 2:
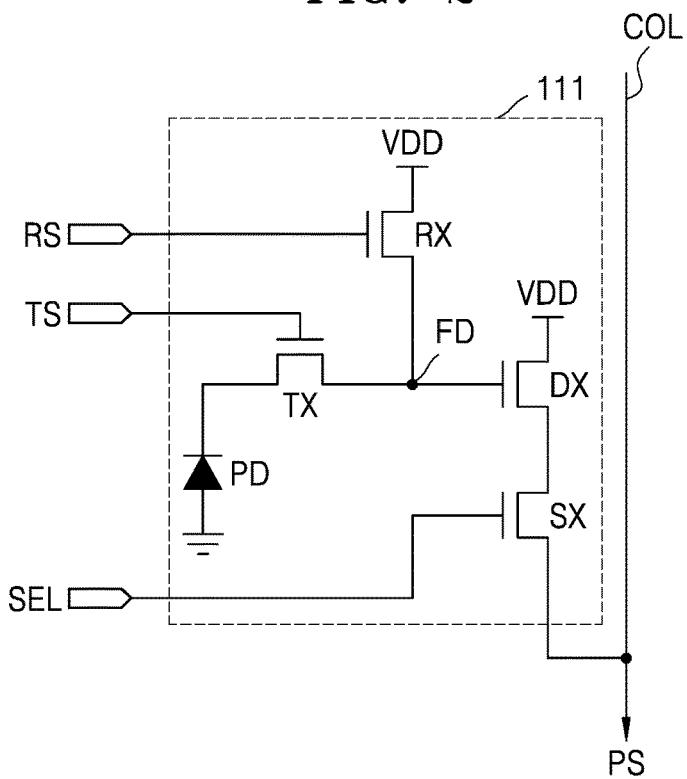
FIG. 2 is a circuit diagram illustrating a pixel according to an example embodiment of the inventive concept.

FIG. 2 is a circuit diagram illustrating a pixel 111 according to an example embodiment of the inventive concept. FIG. 1 is referred to together with FIG. 2.

Referring to FIG. 2, the pixel 111 may include a photodiode PD, a transfer transistor TX, a floating diffusion node FD, a reset transistor RX, a driving transistor DX, and a selection transistor SX. However, the inventive concept is not limited thereto, and the photodiode PD may be replaced with another photoelectric conversion element.

Each of a reset control signal RS provided to the gate electrode of the reset transistor RX, a transfer control signal TS provided to the gate electrode of the transfer transistor TX, and a selection control signal SEL provided to the gate electrode of the select transistor SX may be provided by the row driver 120 according to the row control signal CTR_R generated by the control logic 195 (shown in FIG. 1).

The photodiode PD may generate photocharges that vary depending on the intensity of the incident light. For example, when the photodiode PD is a P-N junction diode, the photodiode PD may generate charges, e.g., electrons which are negative charges and holes which are positive charges, in proportion to the amount of incident light. The photodiode PD is an example of a photoelectric conversion element, and may be at least one of a phototransistor, a photo gate, a pinned photodiode (PPD), and a combination thereof.

The floating diffusion node FD, which may be referred to as a floating diffusion region, may be formed between the transfer transistor TX, the reset transistor RX, and the driving transistor DX. The transfer transistor TX may transfer the photocharge to the floating diffusion node FD according to the transfer control signal TS output from the row driver 120 in FIG. 1. According to an example embodiment of the inventive concept, the floating diffusion node FD may operate as a capacitor. When the transfer transistor TX is turned on in response to the transfer control signal TS applied to the gate terminal of the transfer transistor TX, charges generated by the photodiode PD (e.g., photocharges) may be transmitted to the floating diffusion node FD, and may be stored in the floating diffusion node FD.

The driving transistor DX may amplify photocharges according to a potential corresponding to the amount of photocharges accumulated in the floating diffusion node FD and transmit the amplified photocharges to the selection transistor SX. A drain electrode of the selection transistor SX is connected to a source of the driving transistor DX, and a pixel signal PS may be transmitted to the column line COL connected to the pixel 111 according to the selection signal SEL output from the row driver 120. The reset transistor RX may reset the floating diffusion node FD to a power supply voltage VDD level according to the reset control signal RS provided from the row driver 120.

The reset transistor RX may periodically reset charges accumulated in the floating diffusion node FD. A source electrode of the reset transistor RX may be connected to the floating diffusion node FD, and a drain electrode of the reset transistor RX may be connected to the power supply voltage VDD. When the reset transistor RX is turned on in response to the reset control signal RS applied to the gate electrode of the reset transistor RX, the power supply voltage VDD connected to the drain electrode of the reset transistor RX is transferred to the floating diffusion node FD. When the reset transistor RX is turned on, charges accumulated in the floating diffusion node FD may be discharged to reset the floating diffusion node FD.

The driving transistor DX may operate as a source follower. The driving transistor DX may receive a signal having the amount of charge of the floating diffusion node FD, in other words, the potential of the floating diffusion node FD, through the gate electrode of the driving transistor DX, and buffer the received signal to output the signal to the selection transistor SX. The selection transistor SX may be turned on in response to the selection signal SEL applied to the gate electrode of the selection transistor SX, and when the selection transistor SX is turned on, the buffered signal output from the driving transistor DX may be output as the pixel signal PS through the column line COL.

In FIG. 2, although the pixel 111 is illustrated as having a 4-transistor (4-T) structure including one photodiode PD and four transistors TX, RX, DX, and SX, each of the plurality of pixels 111 included in the image sensor according to an example embodiment of the inventive concept is not limited to the structure of FIG. 2. The pixel 111 may be a pixel having a three-transistor (3T) structure, may include a photodiode (PD), and include three transistors selected from a transfer transistor TX, a reset transistor RX, a driving transistor DX, and a selection transistor SX.

Figure 3:
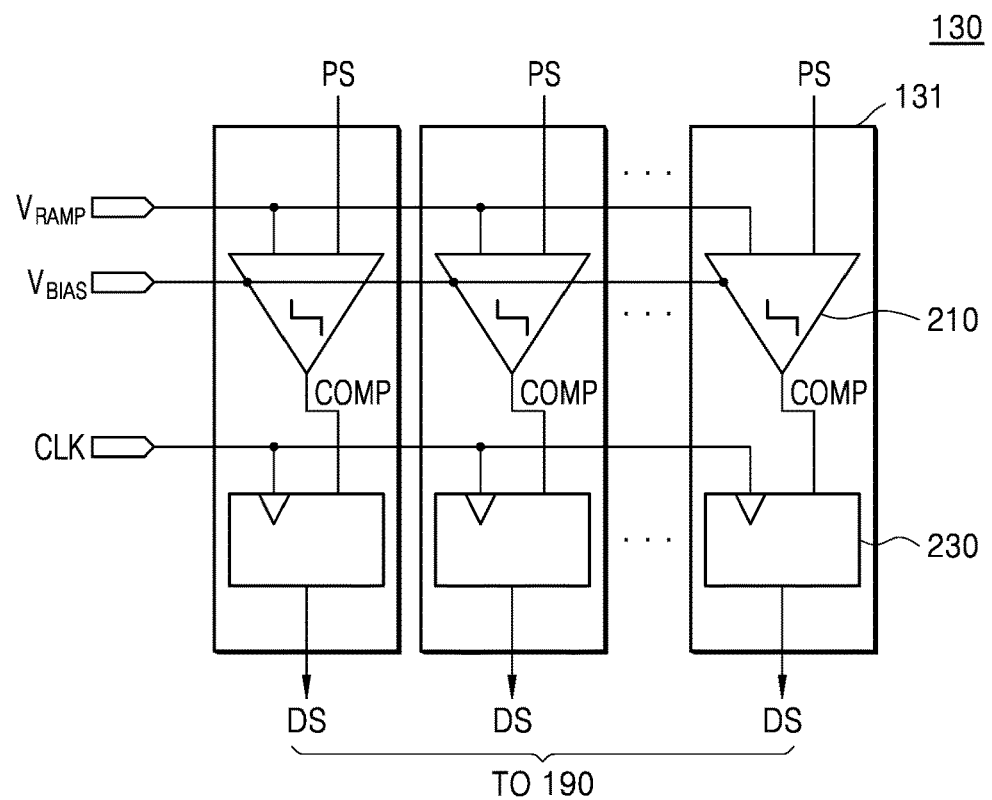
FIG. 3 is a diagram schematically illustrating an analog-to-digital converting array according to an example embodiment of the inventive concept.

FIG. 3 is a diagram schematically illustrating an analog-to-digital converting array 130 according to an example embodiment of the inventive concept. FIG. 1 is referred to together with FIG. 3.

Referring to FIG. 3, the analog-to-digital converting array 130 may include a plurality of ADCs 131, and a bias voltage $V_{BIAS}$ included in the bias signal (FIG. 1, BS), a ramp voltage $V_{RAMP}$ included in the ramp signal (FIG. 1, RS), and the counter clock signal CLK may be commonly provided to each of the ADCs 131.

According to an example embodiment of the inventive concept, the ADC 131 may include a comparator 210 and a counter 230. The comparator 210 may be electrically connected to the bias generator 140 and the bias controller 150.

In the present embodiment, for convenience of explanation, it is illustrated that the comparator 210 compares the pixel signal PS with the ramp signal (FIG. 1, RS) and amplifies the comparison result to generate a comparison signal COMP, but the inventive concept is not limited thereto. For example, it will be understood that the ADC 131 may include a comparator generating a comparison signal as a result of the comparator 210 receiving the pixel signal PS and an amplifier amplifying the comparison signal, respectively.

According to an example embodiment of the inventive concept, the comparator 210 may include a plurality of metal lines. The plurality of metal lines may be separately provided for various operation modes supported by the image sensor 100 (shown in FIG. 1). For example, the comparator 210 may include a first metal line for imaging an object in a full resolution mode, and may include a second metal line for imaging an object in a crop mode. In an example embodiment of the inventive concept, the crop mode is an operation mode for imaging only a part of an imagable area of an object, not an entire imagable object. The operation of the comparator 210 in a particular operation mode of the image sensor 100 may be determined based on the activation of at least one of the metal lines (e.g., application of the bias voltage $V_{BIAS}$).

In an example embodiment of the inventive concept, the plurality of metal lines may be disposed over or under the analog-to-digital converting array 130. In an example embodiment of the inventive concept, the plurality of metal lines may be disposed under the comparator 210, and the bias voltage $V_{BIAS}$ may be commonly provided to the plurality of comparators 210 included in the analog-to-digital converting array 130 through the plurality of metal lines. In the present embodiment, it may be understood that the comparator 210 connected to the metal line to which the bias voltage $V_{BIAS}$ is applied has been activated. In other words, when a metal line is applied with the bias voltage $V_{BIAS}$, the comparator 210 connected to the metal line is activated. According to an example embodiment of the inventive concept, the bias voltage $V_{BIAS}$ may be applied to at least one of the plurality of metal lines, and by activating the comparator 210 connected to the metal line to which the voltage is applied, the pixel signal PS may be compared, amplified, or inverted. The bias controller 150 may control whether the comparator 210 is activated by determining a path of the bias voltage $V_{BIAS}$. Activation of the comparator 210 will be described with reference to FIGS. 5A to 5C and FIGS. 6A to 6C.

The comparator 210 may compare the pixel signal PS with the ramp voltage $V_{RAMP}$ and amplify or invert the comparison result. The comparator 210 may amplify the pixel signal PS to a voltage level suitable for analog-to-digital conversion, when the pixel signal PS is output from the pixel 111 (shown in FIG. 1) connected to any one of the column lines COL (shown in FIG. 1) based on the bias voltage $V_{BIAS}$. When the level of the ramp voltage $V_{RAMP}$ is equal to the level of the amplified signal, the comparator 210 may output the comparison signal COMP that transitions from a first logic level, for example, logic high, to a second logic level, for example, logic low. A time at which the level of the comparison signal COMP is transitioned may be determined depending on the level of the pixel signal PS.

The comparator 210 may include a differential amplifier, which may be implemented as an operational transconductance amplifier (OTA), an operational amplifier, or the like. A ramp voltage $V_{RAMP}$ and a pixel signal PS may be received as an input signal (FIGS. 4A and 4B, INP) at an input terminal of the comparator 210. For example, a pixel signal PS may be input to a negative input terminal of the comparator 210, and a ramp voltage $V_{RAMP}$ may be input to a positive input terminal of the comparator 210, respectively. The comparator 210 may compare the pixel signal PS to the ramp voltage $V_{RAMP}$, and output the comparison operation result as the comparison signal COMP through an output terminal.

The ADC 131 may also include a limiting circuit. The limiting circuit may be connected to an output terminal of the comparator 210 and limit the voltage of the output terminal, in other words, the level of the comparison signal COMP. The limiting circuit may limit the level of the comparison signal COMP not to decrease below a specific level by providing a current to the output terminal. Accordingly, in the comparator 210, it is possible to prevent a drain/source voltage of the transistor to which the pixel signal PS is input from being reduced below a certain level, and column fixed pattern noise (CFPN) generated due to the trap charge may be prevented.

Each of the plurality of counters 230 may be connected to the output terminal of the comparators 210 to count each comparison signal COMP. For example, the control logic 195 (shown in FIG. 1) may generate a counter clock signal and a counter reset signal for controlling a reset operation of the plurality of counters 230, and a counter control signal including an inversion signal for inverting an internal bit of each of the plurality of counters 230.

Each of the plurality of counters 230 may count the level transition time of the comparison signal output from the comparator 210 corresponding to the same column based on the counting clock signal CLK, and output the counting value as a digital signal DS. The counter 230 may transmit the digital signal DS to the output buffer 190 of FIG. 1.

In an example embodiment of the inventive concept, the counter 230 may include a latch circuit and an operation circuit. The latch circuit may latch a code value received as the counting clock signal CLK when the level of the comparison signal received from the comparator 210 is transitioned. The latch circuit may latch each of a code value corresponding to the reset signal, for example, a reset value, and a code value corresponding to the image signal, for example, an image signal value. The operation circuit may generate an image signal value from which the reset level of the pixel 111 is removed by calculating the reset value and the image signal value. The counter 230 may output the image signal value from which the reset level is removed as a pixel value. However, the inventive concept is not limited thereto, and the counter 230 may be implemented as an up-counter that sequentially increases a count value based on the counting clock signal CLK and an operation circuit, or an up/down counter, or a bit-wise inversion counter. In this case, the bit-wise inversion counter may perform an operation similar to the up/down counter. For example, the bit-wise inversion counter may perform a function of only up-counting and a function of making one's complement by inverting all bits inside the counter when a specific signal is input thereto. The bit-wise inversion counter may perform a reset count and then convert the reset count into one's complement, in other words, a negative value by inverting the reset count.

However, the image sensor 100 according to an example embodiment of the inventive concept is not limited thereto. The image sensor 100 may further include a counting code generator that performs a counting code depending on the control of the control logic 195. The counting code generator may be implemented as a gray code generator, and may generate a plurality of code values having a resolution depending on a set number of bits as a counting code. For example, the plurality of counters 230 may include a latch circuit and an operation circuit, and the latch circuit may receive the counting code from the counting code generator and the output signal from the comparator, and may latch the code value of the counting code when the level of the comparison signal transitions. The operation circuit may generate an image signal value from which the reset level of the pixel 111 is removed by calculating a reset value and the image signal value.

Figure 4A:
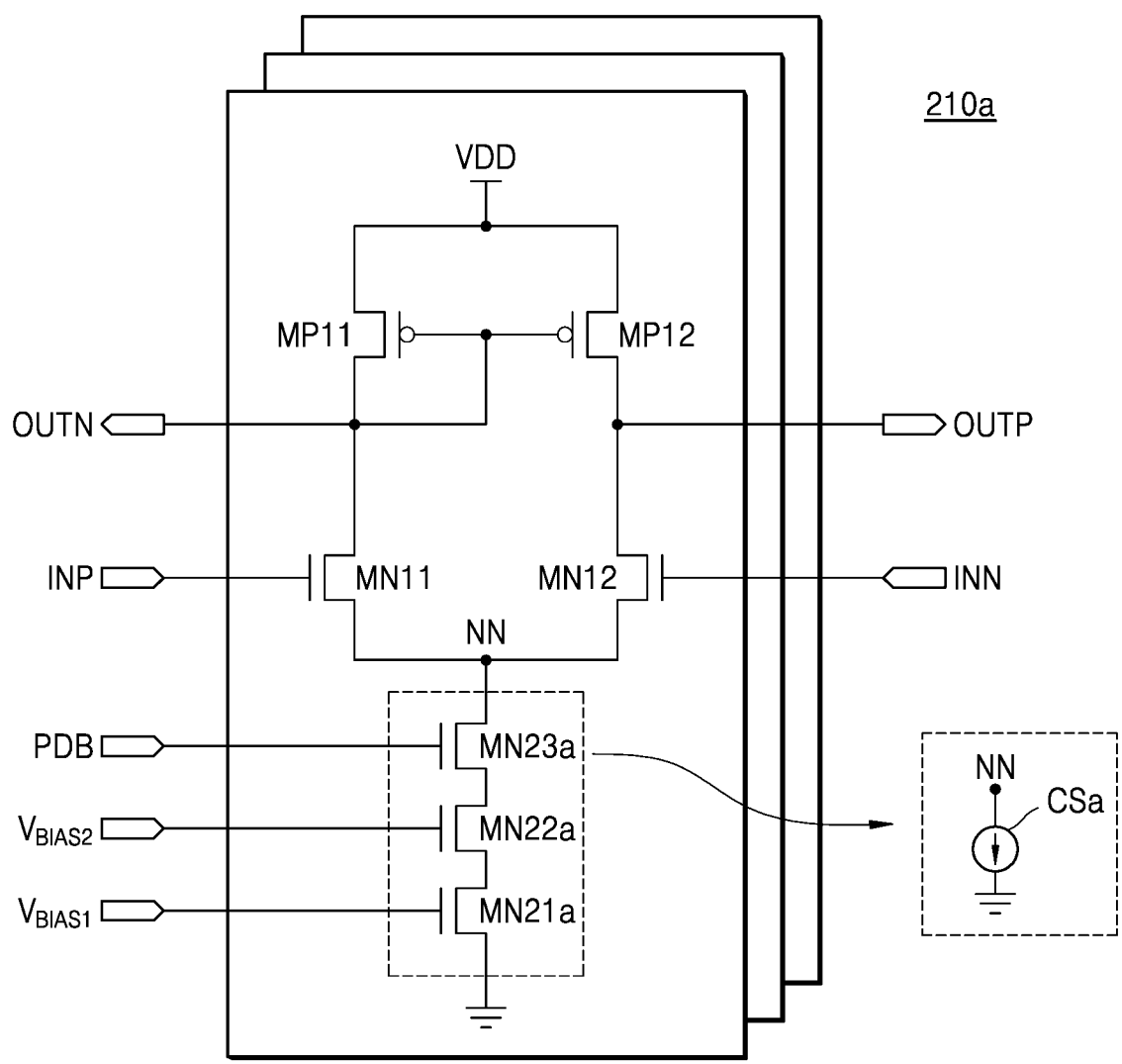
FIG. 4A is a circuit diagram of an amplifier as a comparative example.
Figure 4B:
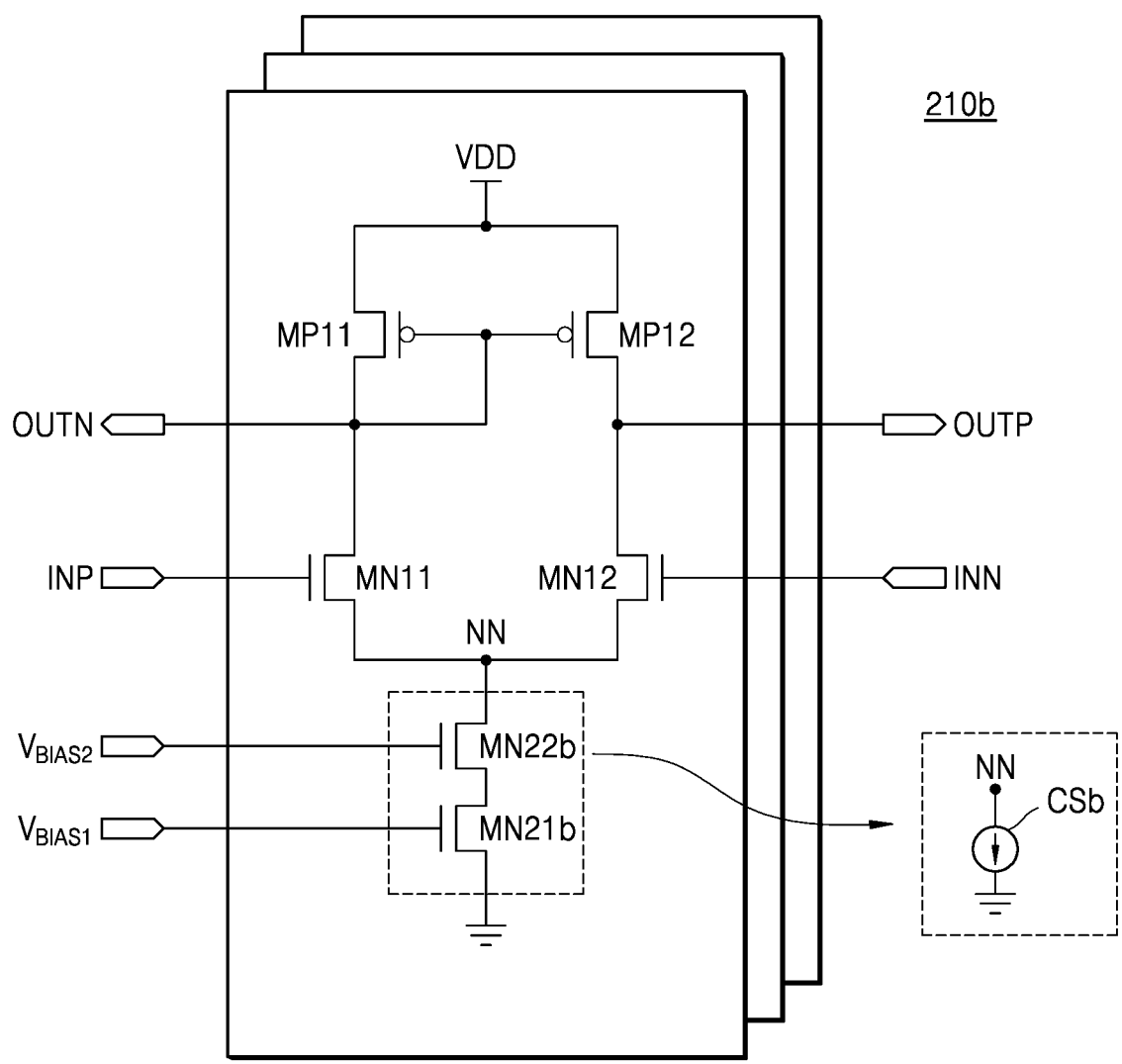
FIG. 4B is a circuit diagram illustrating an amplifier according to an example embodiment of the inventive concept.

FIG. 4A is a circuit diagram of a comparator 210a as a comparative example, and FIG. 4B is a circuit diagram illustrating a comparator 210b according to an example embodiment of the inventive concept.

Referring to FIG. 4A, the comparator 210a may include a plurality of transistors MP11, MP12, MN11, MN12, MN21a, MN22a, and MN23a, and some of the plurality of transistors MN21a, MN22a, and MN23a may be equivalently represented as a current source CSa.

In FIG. 4A, the comparator 210a may include a first P-type transistor MP11, a second P-type transistor MP12, a first N-type transistor MN11, and a second N-type transistor MN12. In addition, the comparator 210a may include a third N-type transistor MN21a, a fourth N-type transistor MN22a, and a fifth N-type transistor MN23a between a first node NN and a ground voltage. For example, the third N-type transistor MN21a, the fourth N-type transistor MN22a, and the fifth N-type transistor MN23a may be implemented as the current source CSa. The current source CSa may be implemented as an NMOS transistor, in other words, an N-type metal oxide semiconductor field effect transistor (MOSFET), and a first end of the current source CSa may be connected to the ground voltage, and a second end of the current source CSa may be connected to the first node NN, such that a bias current may be generated.

The first N-type transistor MN11 and the second N-type transistor MN12 may receive a differential input, for example, a first input signal INP and a second input signal INN, respectively, and generate a differential current according to a level difference between the first input signal INP and the second input signal INN. For example, the ramp voltage $V_{RAMP}$ may be received as the first input signal INP, and the pixel signal PS may be received as the second input signal INN.

When the first input signal INP is equal to the second input signal INN, the same current may flow in the first N-type transistor MN11 and the second N-type transistor MN12, and when the first input signal INP is different from the second input signal INN, different currents may flow in the first N-type transistor MN11 and the second N-type transistor MN12. The sum of the amounts of current flowing through the first N-type transistor MN11 and the second N-type transistor MN12 may be equal to the bias current.

A first end of the first P-type transistor MP11 may be applied with the power supply voltage VDD, and a second end of the first P-type transistor MP11 may be connected to a second output terminal for outputting a second output signal OUTN. The power supply voltage VDD is applied to a first end of the second P-type transistor MP12, and a first output terminal for outputting a first output signal OUTP may be formed at a second end of the second P-type transistor MP12. The first output signal OUTP and the second output signal OUTN may be determined based on current mirroring of the first P-type transistor MP11 and the second P-type transistor MP12. The first output signal OUTP and the second output signal OUTN may be determined based on the amount of current flowing through the first N-type transistor MN11 and the second N-type transistor MN12. When the level of the first input signal INP is higher than the level of the second input signal INN, a larger amount of current flows through the first N-type transistor MN11 compared to the second N-type transistor MN12. Accordingly, the level of the first output signal OUTP may increase and the level of the second output signal OUTN may decrease.

A first bias voltage $V_{BIAS1}$ may be applied as a bias signal BS of FIG. 1 to the gate electrode of the third N-type transistor MN21a, a second bias voltage $V_{BIAS2}$ may be applied as a bias signal BS to the gate electrode of the fourth N-type transistor MN22a, and a power-down signal PDB may be applied to the gate electrode of the fifth N-type transistor MN23a. When the first bias voltage $V_{BIAS1}$ and/or the second bias voltage $V_{BIAS2}$ is applied, the comparator 210a may amplify the pixel signal PS. The first bias voltage $V_{BIAS1}$ and the second bias voltage $V_{BIAS2}$ are not supplied to only one comparator 210a, but may be simultaneously supplied to a plurality of comparators included in the analog-to-digital converting array 130 (shown in FIG. 1). The power-down signal PDB is a signal for cutting off power supply to minimize the power supply when some of the analog-to-digital converting arrays 130 (shown in FIG. 1) are not used for sensing. In this case, the fifth N-type transistor MN23a to which the power-down signal PDB is provided functions as a physical power-down switch.

Since a physical switch is added to the analog-to-digital converting array 130, its own on-resistance is induced, and the input range and bias current of the amplifier may be changed. For example, the comparator 210a in FIG. 4A adopts a structure of three series-connected transistors. As a result, the power-down switch may cause the input range of the minimum operating voltage to be limited and the on-resistance distribution to be deteriorated.

Referring to FIG. 4B, the comparator 210b according to an example embodiment of the inventive concept may include a third N-type transistor MN21b and a fourth N-type transistor MN22b functioning as a switch for receiving a bias voltage, but may not include a fifth N-type transistor MN23a (shown in FIG. 4A) functioning as a physical power-down switch. The third N-type transistor MN21b and the fourth N-type transistor MN22b may be equivalently expressed as a current source CSb.

The comparator 210b according to an example embodiment of the inventive concept may cut off power supply when some of the analog-to-digital converting array 130 is not used for sensing without a physical power-down switch (e.g., the fifth N-type transistor MN23a) by applying the bias voltage separately depending on the operation mode. A method of separately applying the bias voltage in conformity with the operation mode will be described in detail below with reference to FIG. 5A.

Figure 5A:
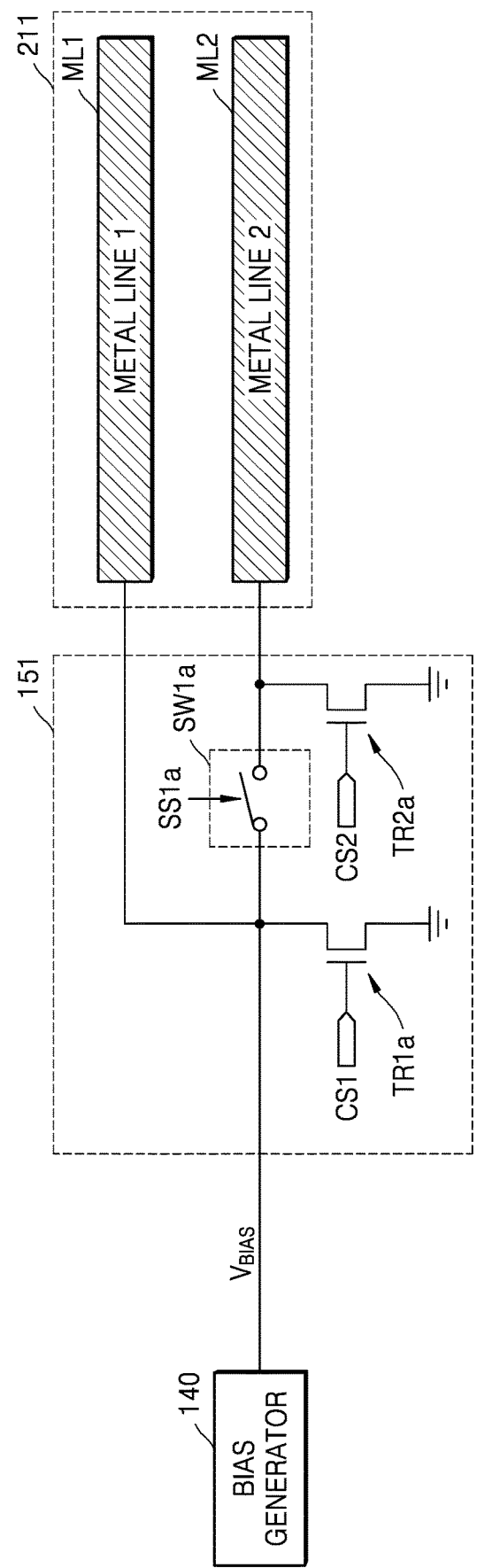
FIGS. 5A, 5B and 5C are diagrams schematically illustrating a plurality of metal lines, a bias generator, and a plurality of transistors according to an example embodiment of the inventive concept.
Figure 5B:
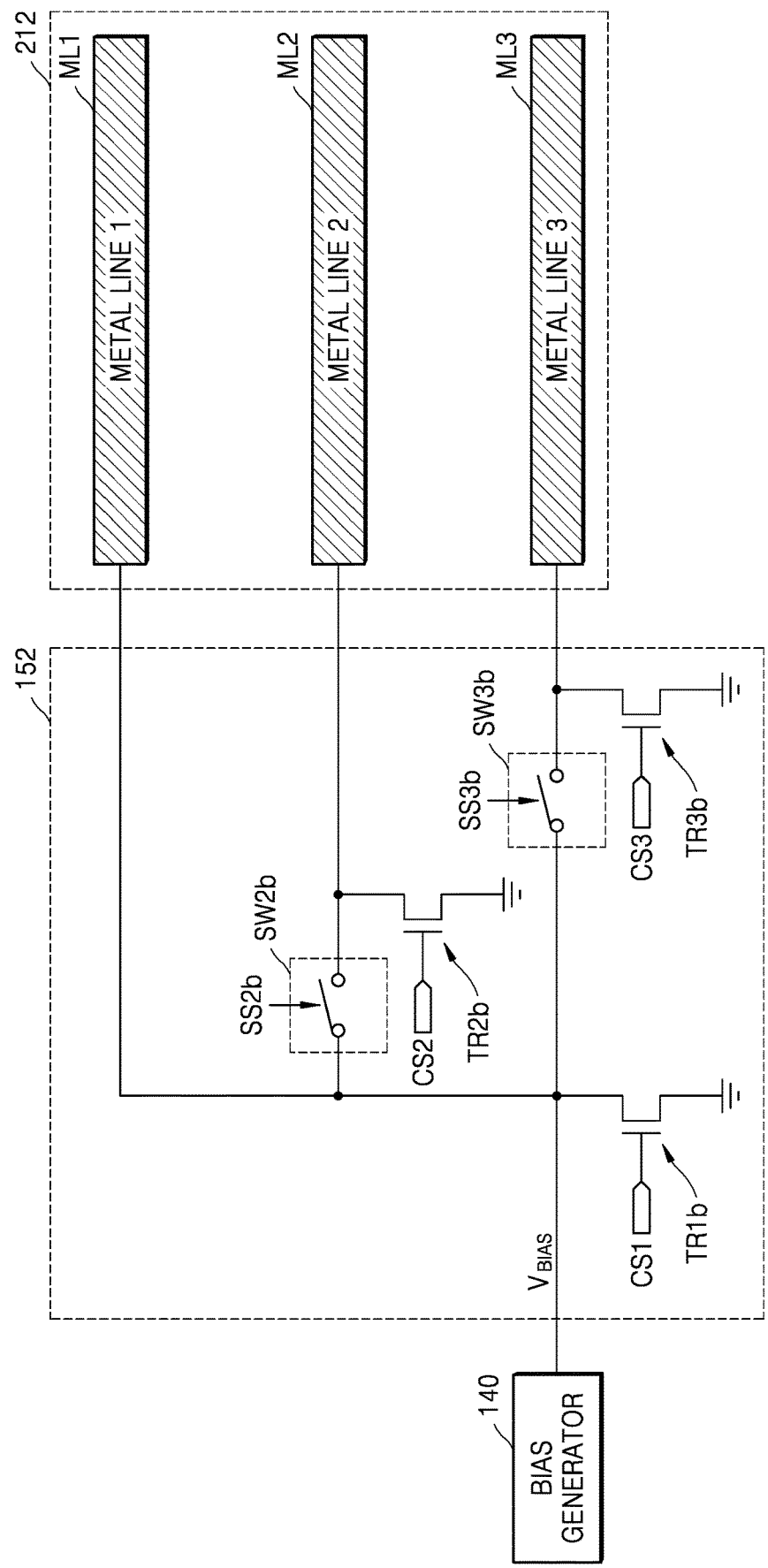
Figure 5C:
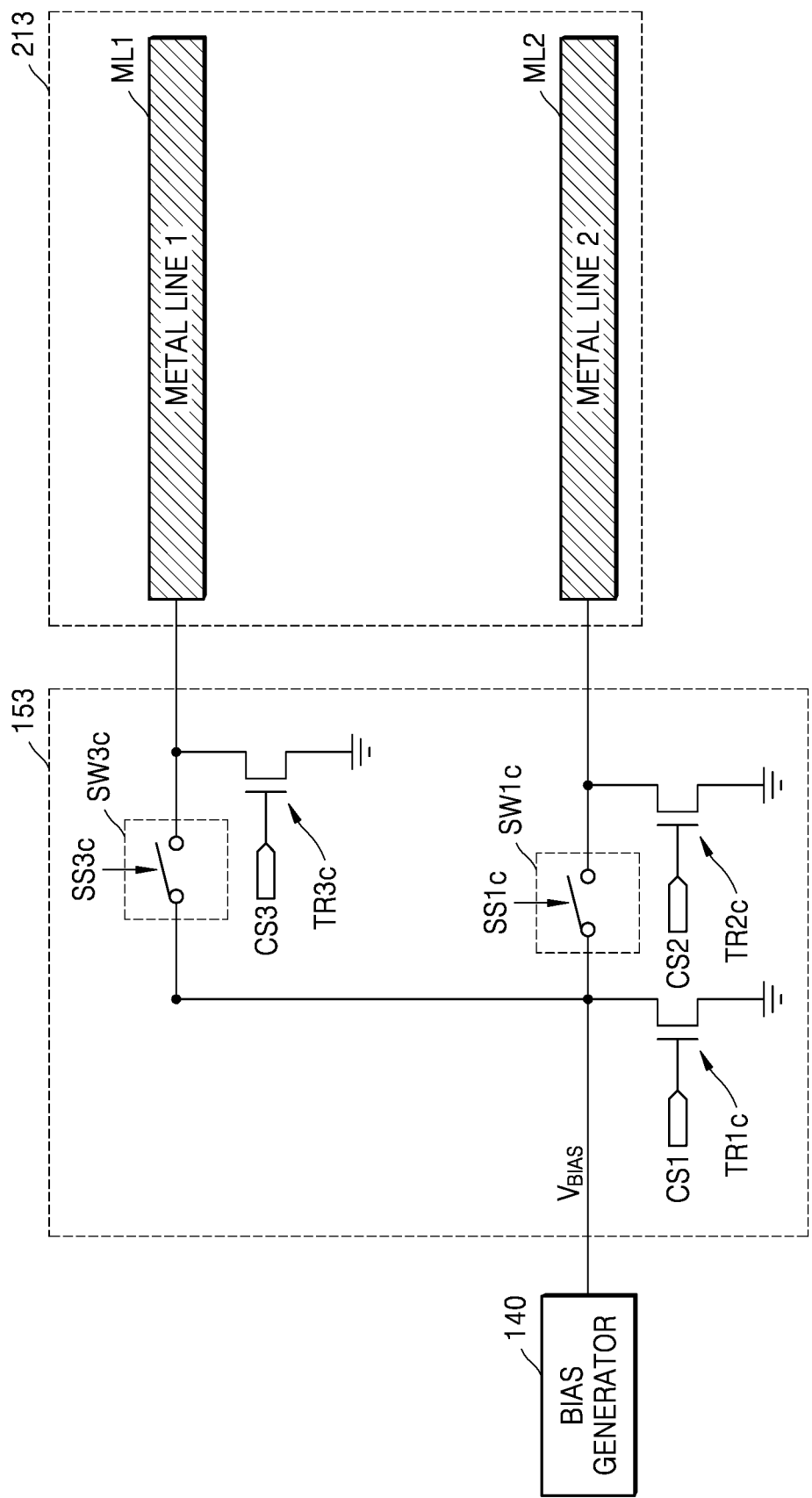

FIGS. 5A to 5C are schematic diagrams illustrating a plurality of metal lines 211, 212, and 213, the bias generator 140, and a bias controller 151, 152, and 153 according to an example embodiment of the inventive concept.

Referring to FIG. 5A together with FIGS. 1 and 3, a first metal line ML1 and a second metal line ML2 included in the ADC 131 may be referred to as a plurality of metal lines 211. According to an example embodiment of the inventive concept, the plurality of metal lines 211 may be disposed below or above the comparator 210 (shown FIG. 3) and receive a bias voltage $V_{BIAS}$. For example, the bias voltage $V_{BIAS}$ may include a first bias voltage $V_{BIAS1}$ and a second bias voltage $V_{BIAS2}$ having different levels.

According to an example embodiment of the inventive concept, the plurality of metal lines 211 may be provided for an operation mode supported by the image sensor 100 (shown in FIG. 1). The operation mode of the image sensor 100 may include a full resolution mode, a crop mode, a binning mode, a power saving mode (e.g., power down), and the like, and may vary depending on an imaging scenario. For example, in the crop mode, the first metal line ML1 may provide a bias voltage $V_{BIAS}$ to some of the plurality of comparators 210 included in the analog-to-digital converting array 130. In addition, the second metal line ML2 may not provide the bias voltage $V_{BIAS}$ to the remaining ones of the plurality of comparators 210 included in the analog-to-digital converting array 130. The remaining ones of the plurality of comparators 210 to which the bias voltage $V_{BIAS}$ is not provided may be included in the ADC 131 corresponding to the column line COL (shown in FIG. 1) of the pixel array 100 (shown in FIG. 1) that is not sensed in the crop mode. Because the bias voltage $V_{BIAS}$ is not applied to the comparator 210 corresponding to the unsensed region, power consumption of the image sensor 100 may be minimized.

According to an example embodiment of the inventive concept, the bias controller 151 may further include a first transistor TR1a, a second transistor TR2a, and a first switch SW1a. The first transistor TR1a and the second transistor TR2a may determine the path of the bias voltage $V_{BIAS}$ provided to the plurality of metal lines 211. According to an example embodiment of the inventive concept, whether the first metal line MLA and/or the second metal line ML2 is activated by turning on-off of the first transistor TR1a and/or the second transistor TR2a may be determined. For example, when the first transistor TR1a is turned on, a ground voltage may be applied to the first metal line ML1. In this case, no voltage is applied to the first metal line ML1, so that the first metal line ML1 may be deactivated. For example, when the second transistor TR2a is turned on, a ground voltage may be applied to the second metal line ML2. In this case, no voltage is applied to the second metal line ML2, so that the second metal line ML2 may be deactivated.

According to an example embodiment of the inventive concept, a first control signal CS1 may be provided to the gate electrode of the first transistor TR1, and a second control signal CS2 may be provided to the gate electrode of the second transistor TR2. Whether the first transistor TR1a and the second transistor TR2a are activated may be determined depending on the logic levels (e.g., logic high or logic low) of the first control signal CS1 and the second control signal CS2. Activation of the first and second transistors TR1a and TR2a may mean turning on/off the first and second transistors TR1a and TR2a.

According to an example embodiment of the inventive concept, the first transistor TR1a may determine whether to apply the bias voltage $V_{BIAS}$ to all of the plurality of metal lines 211. The second transistor TR2a may determine whether to apply the bias voltage $V_{BIAS}$ to the second metal line ML2 among the plurality of metal lines 211.

According to an example embodiment of the inventive concept, the first switch SW1a may be included between the first transistor TR1a and the second transistor TR2a. The first switch SW1a may be controlled by a first switch signal SS1a. The first switch SW1a may block the application of the ground power to the second metal line ML2 when the first transistor TR1a is switched on, or block the application of the ground power to the first metal line ML1 when the second transistor TR2a is switched on.

In an example embodiment of the inventive concept, for various operations of the image sensor 100 (shown in FIG. 1), it is shown that both the first bias voltage $V_{BIAS1}$ and the second bias voltage $V_{BIAS2}$ are applied to the comparator 210a as a bias signal BS (shown in FIG. 1), but the inventive concept is not limited thereto. The comparator 210a may receive one bias voltage $V_{BIAS1}$ through one transistor, for example, the third N-type transistor MN21a, or receive three or more bias voltages through three or more transistors.

The analog-to-digital converting array 130 and/or the image sensor 100 including the analog-to-digital converting array 130 according to an example embodiment of the inventive concept may reduce the number of physical switches by separately applying the bias voltage depending on an operation mode. Accordingly, the analog-to-digital converting array 130 and the image sensor 100 may reduce noise (e.g., CFPN, or thermal noise) caused by the physical switch, minimize an increase in resistance, and stabilize the input range of the comparator 210.

In addition, because the analog-to-digital converting array 130 and/or the image sensor 100 including the analog-to-digital converting array 130 according to an example embodiment of the inventive concept may reduce noise by reducing the number of physical switches, a low-power circuit design may be easily achieved even though the input voltage is gradually reduced to realize low power.

In addition, the analog-to-digital converting array 130 and/or the image sensor 100 including the analog-to-digital converting array 130 according to an example embodiment of the inventive concept may increase space efficiency in terms of circuit layout design by reducing the number of physical switches.

Referring to FIG. 5B together with FIGS. 1 and 3, the bias controller 152 further includes a first transistor TR1b, a second transistor TR2b and a second switch SW2b, and a third transistor TR3b and a third switch SW3b. In addition, since the image sensor 100 supports various modes, such as a binning mode, a plurality of metal lines 212 may further include a third metal line ML3 in addition to the first metal line ML1 and the second metal line ML2. In FIGS. 5A and 5B, the plurality of metal lines 211 and 212 are illustrated as including two or three metal lines ML1, ML2, and ML3 for simplicity of explanation, but the inventive concept is not limited thereto. By using various numbers of metal lines in combination, it is possible to inactivate metal lines that are not sensed or processed for each operation mode.

Since the plurality of metal lines 212 includes three metal lines ML1 to ML3 in FIG. 5B, an extra transistor may be added compared to FIG. 5A. According to an example embodiment of the inventive concept, the first transistor TR1b may be connected to a common node of the first metal line ML1 and the bias generator 140, and may be controlled by the first control signal CS1. The second transistor TR2b may be connected to the second metal line ML2 and may be controlled by the second control signal CS2. The third transistor TR3b may be connected to the third metal line ML3 and may be controlled by a third control signal CS3.

The second switch SW2b may be connected between the common node of the first metal line ML, and the bias generator 140 and a common node of the second transistor TR2b and the second metal line ML2 and be controlled by a second switch signal SS2b. The third switch SW3b may be connected between the common node of the first metal line ML1 and the bias generator 140 and a common node of the third transistor TR3b and the third metal line ML3 and be controlled by a third switch signal SS3b.

According to an example embodiment of the inventive concept, the first transistor TR1b may determine whether to apply a bias voltage $V_{BIAS}$ to all of the plurality of metal lines 212. The second transistor TR2b may determine whether to apply the bias voltage $V_{BIAS}$ to the second metal line ML2 among the plurality of metal lines 212. The third transistor TR3b may determine whether to apply the bias voltage $V_{BIAS}$ to the second metal line MU among the plurality of metal lines 212.

The second switch SW2b may block the application of the ground power to the second metal line ML2 when the first transistor TR1b is switched on, or block application of the ground power to the first metal line ML1 or the third metal line ML3 when the second transistor TR2b is switched on. The third switch SW3b may block the application of the ground power to the third metal line ML3 when the first transistor TR1b is switched on, or block the application of the ground power to the first metal line ML1 or the second metal line ML2 when the third transistor TR3b is switched on.

Referring to FIG. 5C together with FIGS. 1 and 3, the bias controller 153 may further include a first transistor TR1c, a second transistor TR2c, a third transistor TR3c, a fourth switch SW1c, and a fifth switch SW3c. A plurality of metal lines 213 may include a first metal line ML1 and a second metal line ML2.

According to an example embodiment of the inventive concept, the first transistor TR1c may be connected to a common node of the first metal line ML1 and the bias generator 140, and may be controlled by a first control signal CS1. The second transistor TR2c may be connected to the second metal line ML2 and may be controlled by a second control signal CS2. The third transistor TR3c may be connected to the first metal line ML1 and may be controlled by a third control signal CS3.

The fourth switch SW1c may be connected between the common node of the first metal line MLA and the bias generator 140 and a common node of the second transistor TR2c and the second metal line ML2 and may be controlled by a fourth switch signal SS1c. The fifth switch SW3c may be connected between the common node of the first metal line ML1 and the bias generator 140 and a common node of the third transistor TR3c and the first metal line ML1, and may be controlled by a fifth switch signal SS3c.

According to an example embodiment of the inventive concept, the first transistor TR1c may determine whether to apply a bias voltage $V_{BIAS}$ to all of the plurality of metal lines 212. The second transistor TR2c may determine whether to apply the bias voltage $V_{BIAS}$ to the second metal line ML2 among the plurality of metal lines 212. The third transistor TR3c may determine whether to apply the bias voltage $V_{BIAS}$ to the first metal line ML among the plurality of metal lines 212.

The fourth switch SW1c may block the application of the ground power to the second metal line ML2 when the first transistor TR1c is switched on, or block the application of the ground power to the first metal line ML1 when the second transistor TR2c is switched on. The fifth switch SW3c may block the application of the ground power to the first metal line ML1 when the first transistor TR1c is switched on, or block the application of the ground power to the second metal line ML2 when the third transistor TR3c is switched on.

According to an example embodiment of the inventive concept, each of at least two metal lines, for example, the first metal line ML1 and the second metal line ML2, included in the plurality of metal lines 213 may include a transistor, for example, the second transistor TR2c or the third transistor TR3c, and a switch, for example, the fourth switch SW1c or the fifth switch SW3c. Accordingly, the image sensor 100 (shown in FIG. 1) operating in the crop mode may selectively activate the comparators 210 (shown FIG. 3) required for the crop mode.

Figure 6A:
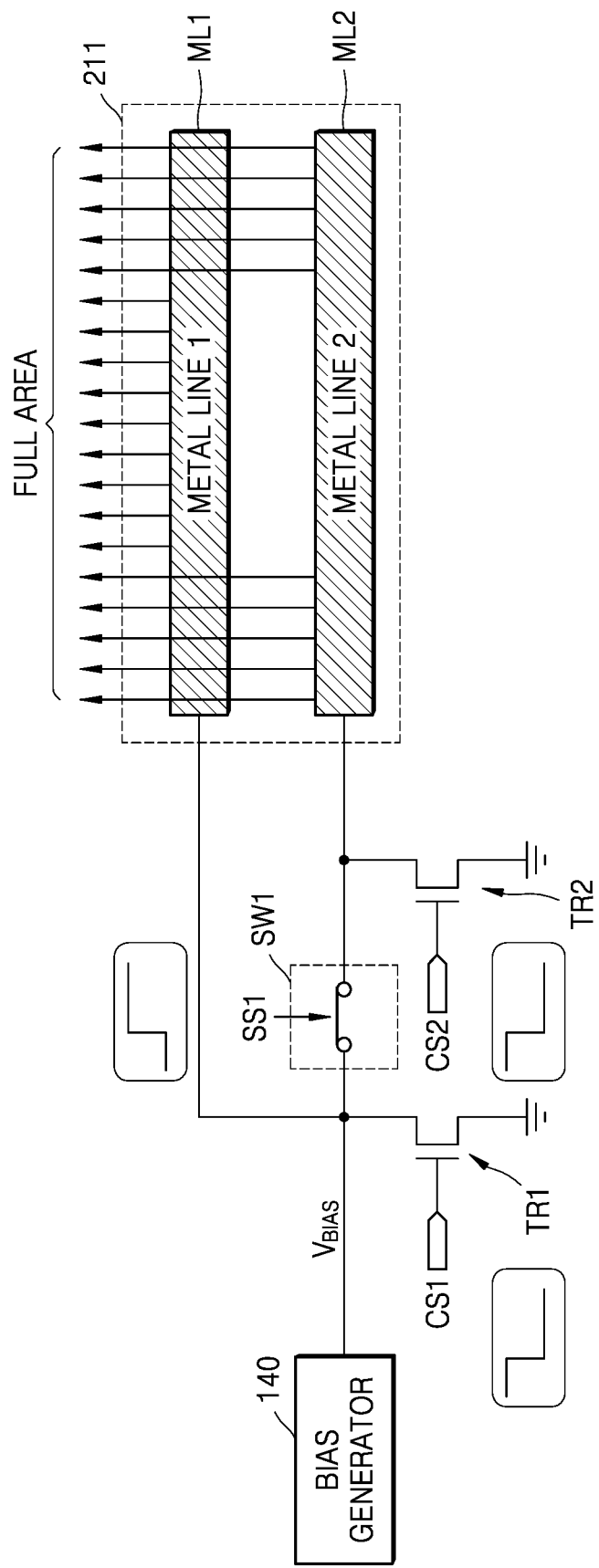
FIGS. 6A, 6B and 6C are diagrams schematically illustrating a plurality of metal lines, a bias generator, and a plurality of transistors according to an example embodiment of the inventive concept.
Figure 6B:
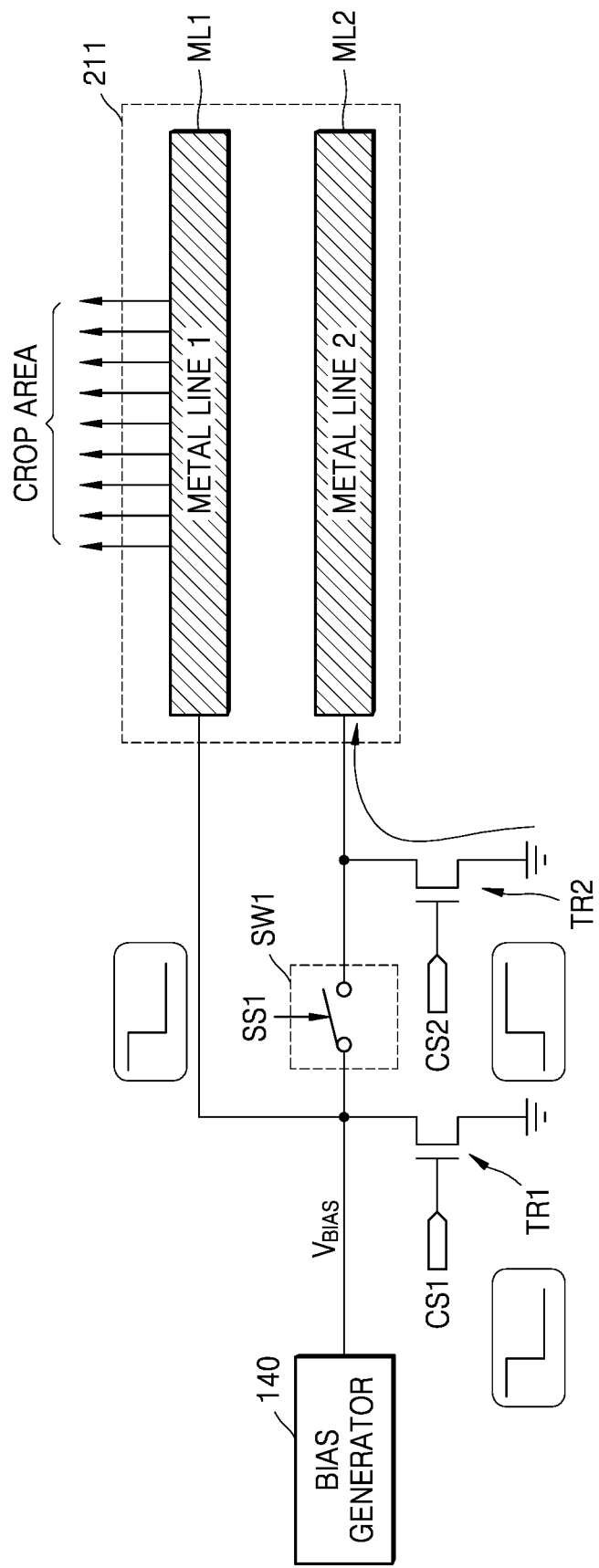
Figure 6C:
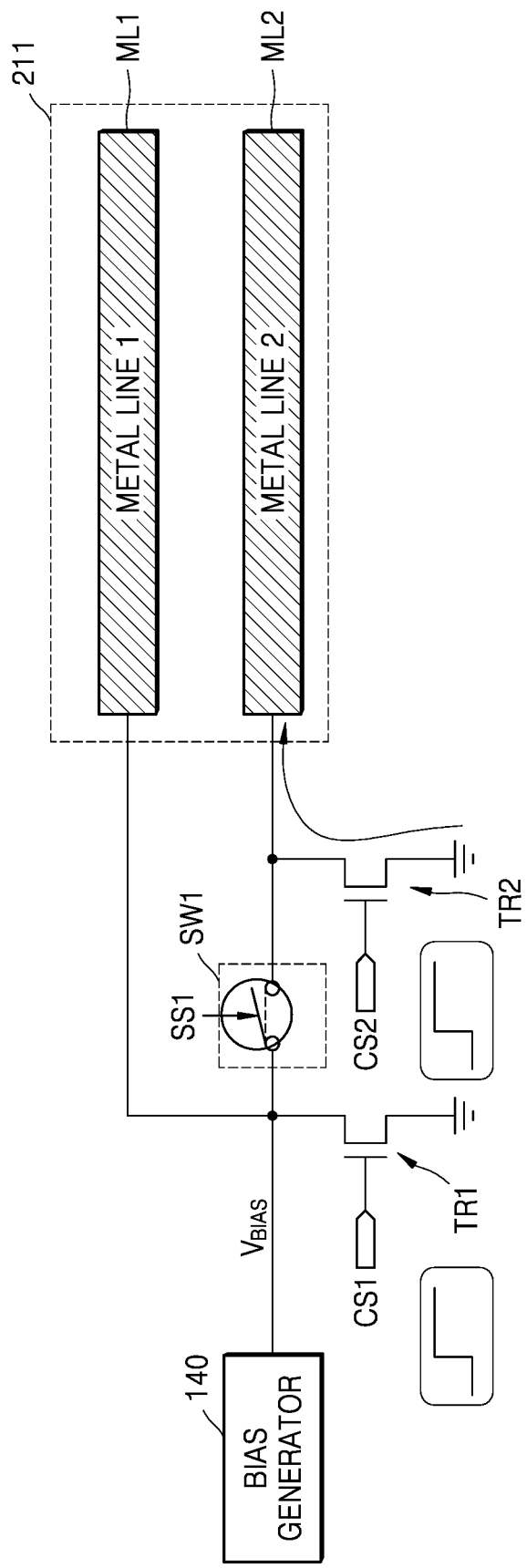

FIGS. 6A to 6C are diagrams schematically illustrating a plurality of metal lines 211, a bias generator 140, and a plurality of transistors TR1 and TR2 according to an example embodiment of the inventive concept. FIGS. 1 and 5A are referred to together with FIGS. 6A to 6C.

In the present embodiment, for convenience of description, it is assumed that both the first transistor TR1 and the second transistor TR2 are N-type MOSFETs. Accordingly, the first and second control signals CS1 and CS2 of the first and second transistors TR1 and TR2 are described based on an N-type MOSFET. However, the inventive concept is not limited thereto, and thus, the inventive concept does not exclude a case in which the first transistor TR1 and the second transistor TR2 are P-type MOSFETs. In this case, the logic levels of the first and second control signals CS1 and CS2 of the first and second transistors may TR1 and TR2 have opposite phases.

Referring to FIG. 6A, the first control signal CS1 may be applied logic low L. In this case, a channel of the first transistor TR1 is not formed and the first transistor TR1 is deactivated. As a result, the ground voltage connected to one end of the first transistor TR1 is not provided to the other end of the first transistor TR1.

The second control signal CS2 may be applied as logic low L. In this case, the channel of the first transistor TR1 is not formed, and the second transistor TR2 is deactivated. Accordingly, the ground voltage connected to one end of the second transistor TR2 is not provided to the other end of the second transistor TR2.

The first switch signal SS1 may be applied logic high H, and a first switch SW1 may be shorted.

As a result, the bias voltage $V_{BIAS}$ generated by the bias generator 140 may be provided to both the first metal line ML1 and the second metal line ML2. The first metal line ML1 may provide the bias voltage $V_{BIAS}$ to some of the plurality of comparators 210 and the second metal line ML2 may provide the bias voltage $V_{BIAS}$ to the remaining ones of the plurality of comparators 210. In other words, the first metal line ML1 may provide the bias voltage $V_{BIAS}$ to a first portion of the plurality of comparators 210, and the second metal line ML2 may provide the bias voltage $V_{BIAS}$ to a second portion of the plurality of comparators 210. As a result, the bias voltage may be provided to all comparators 210 (e.g., activation). A case in which the bias voltage $V_{BIAS}$ is applied to all the comparators 210 may correspond to a full resolution mode.

Referring to FIG. 6B, the first control signal CS1 may be applied as logic low L. In this case, the channel of the first transistor TR1 is not formed, and the first transistor TR1 is deactivated, and thus, the ground voltage connected to one end of the first transistor TR1 is not provided to the other end of the first transistor TR1.

The second control signal CS2 may be applied as logic high H. In this case, the channel of the second transistor TR2 may be formed and the second transistor TR2 is turned on. Accordingly, the ground voltage connected to one end of the second transistor TR2 is provided to the other end of the second transistor TR2. In this case, the ground voltage may be applied to the second metal line ML2 to inactivate the second metal line ML2.

The first switch signal SS1 may be applied logic low L, and the first switch SW1 may be opened to block the ground voltage from being provided to the first metal line ML1.

As a result, the bias voltage $V_{BIAS}$ generated by the bias generator 140 may be provided to the first metal line ML1. The first metal line ML1 may provide a bias voltage $V_{BIAS}$ to some of the plurality of comparators 210, and the second metal line ML2 may not provide the bias voltage $V_{BIAS}$ to the remaining ones of the plurality of comparators 210. Accordingly, only some of the plurality of comparators 210 may perform an analog-to-digital converting operation. A case in which the bias voltage $V_{BIAS}$ is applied only to some of the plurality of comparators 210 may correspond to a crop mode.

Referring to FIG. 6C, the first control signal CS1 may be applied as logic high H, a channel of the first transistor TR1 is formed, and the first transistor TR1 is activated. Accordingly, the ground voltage connected to one end of the first transistor TR1 is provided to the other end of the first transistor TR1.

The second control signal CS2 may be applied as logic high H. In this case, the channel of the second transistor TR2 is formed, and the second transistor TR2 is activated. Accordingly, the ground voltage connected to one end of the second transistor TR2 is provided to the other end of the second transistor TR2. Accordingly, the ground voltage may be applied to the second metal line ML2 to inactivate the second metal line ML2.

In this case, the first switch signal SS1 may be applied logic high H or logic low L (D: Don't care). Because, if the first switch SW1 is opened, the ground voltage may be provided to the first metal line ML1 through the first transistor TR1 and the ground voltage may be provided to the second metal line ML2 through the second transistor TR2, and conversely, if the first switch SW1 is short-circuited, the ground voltage may be provided to both the first metal line ML1 and the second metal line ML2 through the first transistor TR1. As a result, when the second control signal CS2 is the logic low L, the logic level of the first switch signal SS1 is irrelevant (D).

Using a similar logic, in a case where the first control signal CS1 is applied as logic high H, when the first switch signal SS1 is applied as logic high H, the logic level of the second control signal CS2 is irrelevant (D). For example, when the second control signal CS2 is the logic low L, the ground voltage may be provided to the second metal line ML2 through the short-circuited first switch SW1, since the first transistor TR1 is activated. In addition, when the second control signal CS2 is the logic high H, the ground voltage may be provided to the second metal line ML2 through the short-circuited first switch SW1 since the first transistor TR1 is activated, or the ground voltage may be directly provided to the second metal line ML2 since the second transistor TR2 is activated.

A case in which all of the plurality of comparators 210 are deactivated by applying the ground voltage to all of the plurality of metal lines 211 without the bias voltage $V_{BIAS}$ may correspond to a power saving mode.

FIG. 6D is a table showing signal levels depending on operation modes of the ADC 131 according to an example embodiment of the inventive concept.

Referring to FIG. 6D together with FIGS. 6A to 6C, in order to support the full resolution mode FULL of the ADC 131, both of the first control signal CS1, and the second control signal CS2 need to be applied as logic low L, and the first switch signal SS1 needs to be applied as logic high H. As a result, the bias voltage $V_{BIAS}$ may be applied to the first metal line ML1 and the second metal line ML2.

In order to support the crop mode CROP of the ADC 131, both the first control signal CS1 and the first switch signal SS1 need to be applied as logic low L, and the second control signal CS2 needs to be applied as logic high H. As a result, the bias voltage $V_{BIAS}$ may be applied to the first metal line ML1 and the ground voltage $V_{SS}$ may be applied to the second metal line ML2.

In order to support the power saving mode PWROFF of the ADC 131, at least two of the first control signal CS1, the second control signal CS2, and the first switch signal SS1 are required to be logic high H. For example, when the first control signal CS1 and the second control signal CS2 are applied as logic high H, the first switch signal SS1 is independent of the logic level of the applied voltage (D). For example, when the first control signal CS) and the first switch signal SS1 are applied as logic high H, the second control signal CS2 is independent of the logic level of the applied voltage (D). For example, when the second control signal CS2 and the first switch signal SS1 are applied as logic high H, the first control signal CS1 is independent of the logic level of the applied voltage (D). As a result, the ground voltage $V_{SS}$ may be applied to both the first metal line ML1 and the second metal line ML2. As described above, when the first transistor TR1 and the second transistor TR2 are P-type MOSFETs, the logic levels of the control signals CS1 and CS2 of the transistors TR1 and TR2 may be opposite in phase.

Figure 7A:
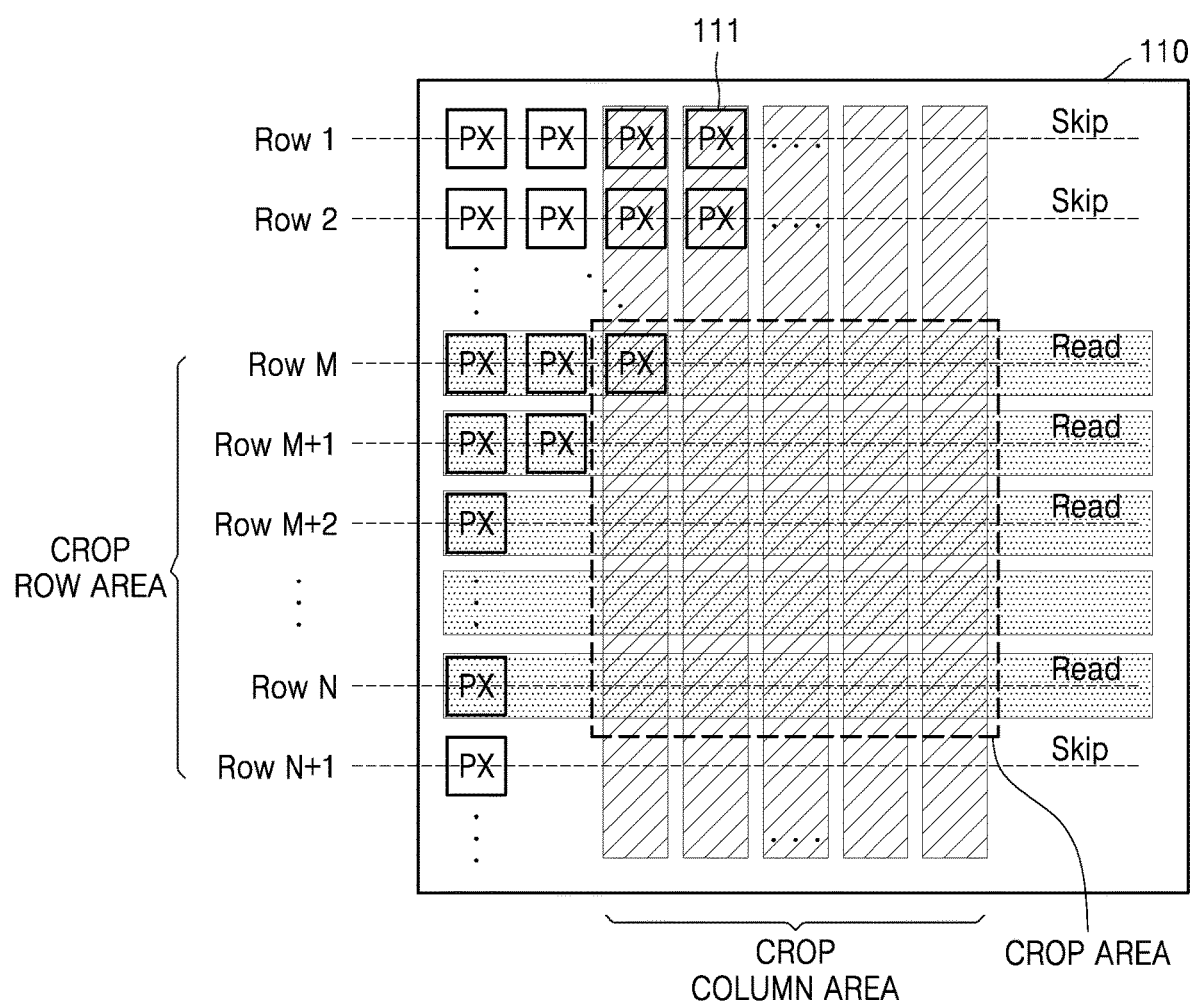
FIG. 7A is a diagram illustrating a pixel array in a crop mode according to an example embodiment of the inventive concept.

FIG. 7A is a diagram illustrating a pixel array depending on a crop mode according to an example embodiment of the inventive concept.

Referring to FIG. 7A, a pixel array 110 may sequentially read a plurality of rows corresponding to the crop area CROP AREA among the plurality of rows ROW1 to ROW (N+1).

The operation mode of the image sensor 100 (shown FIG. 1) according to an example embodiment of the inventive concept may be determined by an external controller (e.g., an application processor). For example, the crop area CROP AREA may be set as a target area by an external application processor.

The crop area CROP AREA may include an M-th row to an N-th row (crop row area). In an example embodiment of the inventive concept, the pixel array 110 may skip the remaining rows except for the crop area CROP AREA, and sequentially read the M-th row ROW(M) to the N-th row ROW(N). The pixel signal PS read out for each row may be output in a column direction of the pixel array 110.

Depending on the control of the application processor for the crop area CROP AREA, location information of the pixel 111 with respect to the crop area CROP AREA, in other words, location information of the column line COL may also be provided. For example, under the control of the application processor, the column decoder 170 (shown in FIG. 1) may select only a column corresponding to the crop area CROP AREA (e.g., crop column area), and an analog-to-digital conversion operation may be performed only on the column corresponding to the crop area CROP AREA. In this case, among the metal lines included in the comparator 210 (shown in FIG. 3), only metal lines corresponding to the crop area CROP AREA may be activated, and metal lines not included in the crop area CROP AREA may be deactivated.

Figure 7B:
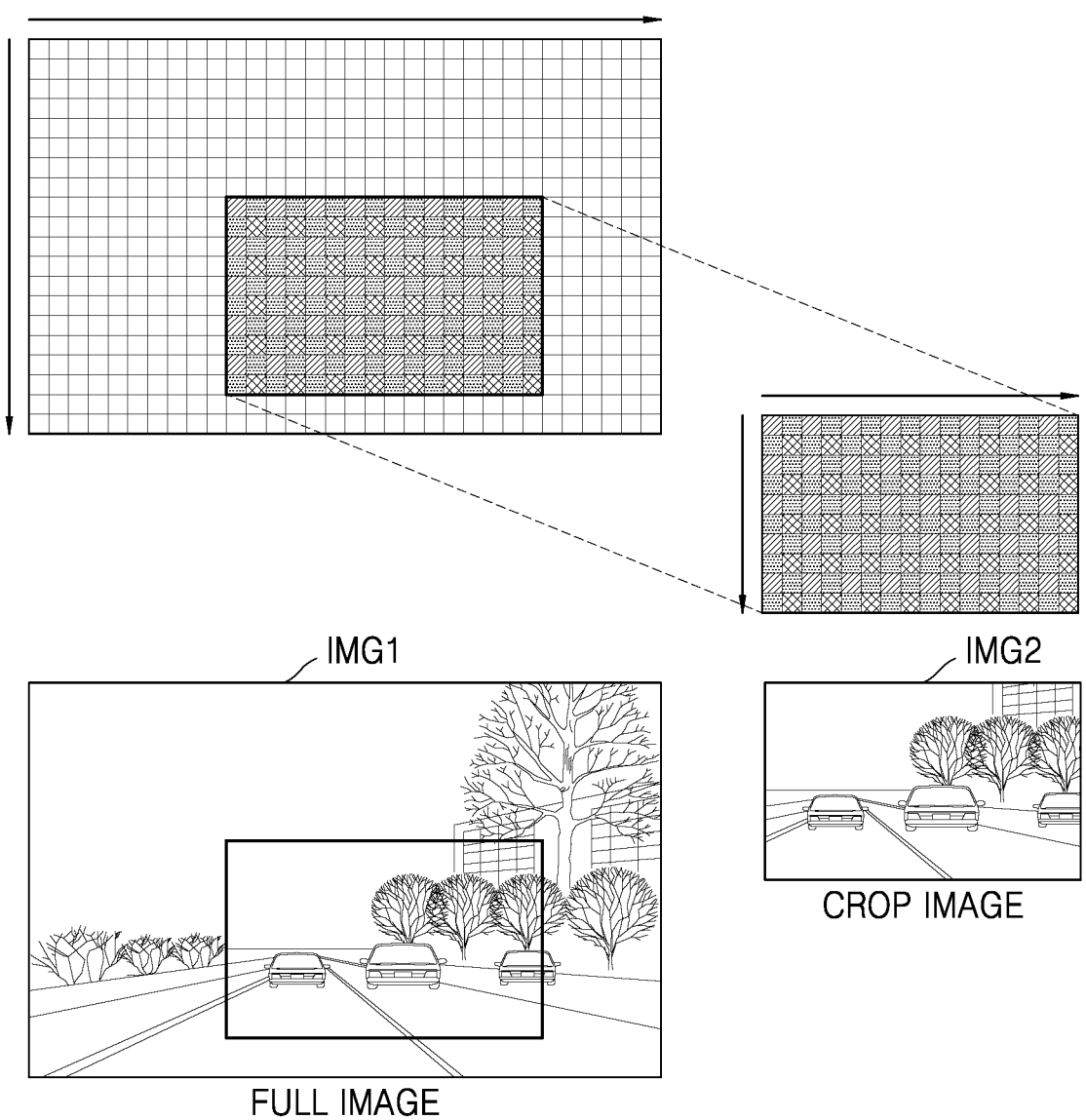
FIG. 7B is a diagram for explaining image processing according to an example embodiment of the inventive concept.

FIG. 7B is a diagram for explaining image processing according to an example embodiment of the inventive concept.

The read-out pixel is illustrated as four sub-pixels in which red, green, and blue are arranged in the order of R-G-B-G in a clockwise direction from the upper left. In all the drawings of FIG. 7B, the four sub-pixels arranged in the order of R-G-B-G in a clockwise direction from the upper left indicate that colors are expressed by a combination of R-G-B light when output to a display unit, and the actual implementation of the pixel array 110 of the image sensor 100 does not mean that the pixel array 110 consists of four sub-pixels.

A first image IMG1 corresponds to a result of the image sensor 100 capturing the object in the full resolution mode, and a second image IMG2 corresponds to a result of the image sensor 100 capturing the object in the crop mode. According to an example embodiment of the inventive concept, among the plurality of comparators 210 included in the analog-to-digital converting array 130, a bias voltage may not be provided to the comparator 210 that is not included in the crop area. Accordingly, power consumed by the comparator 210 on which the analog-to-digital conversion operation is not performed may be reduced.

Figure 8:
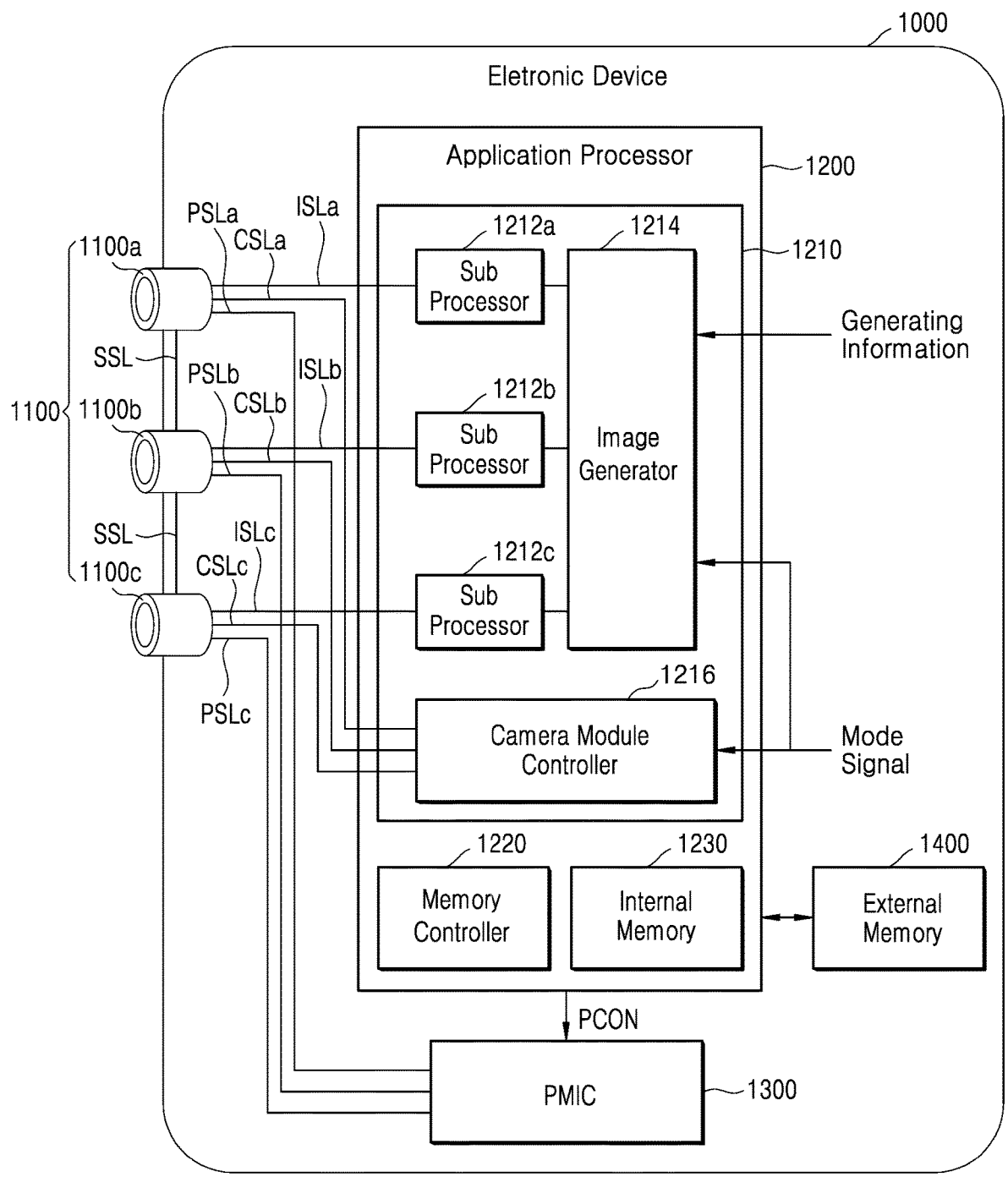
FIG. 8 is a block diagram of an electronic device including a multi-camera module according to an example embodiment of the inventive concept.
Figure 9:
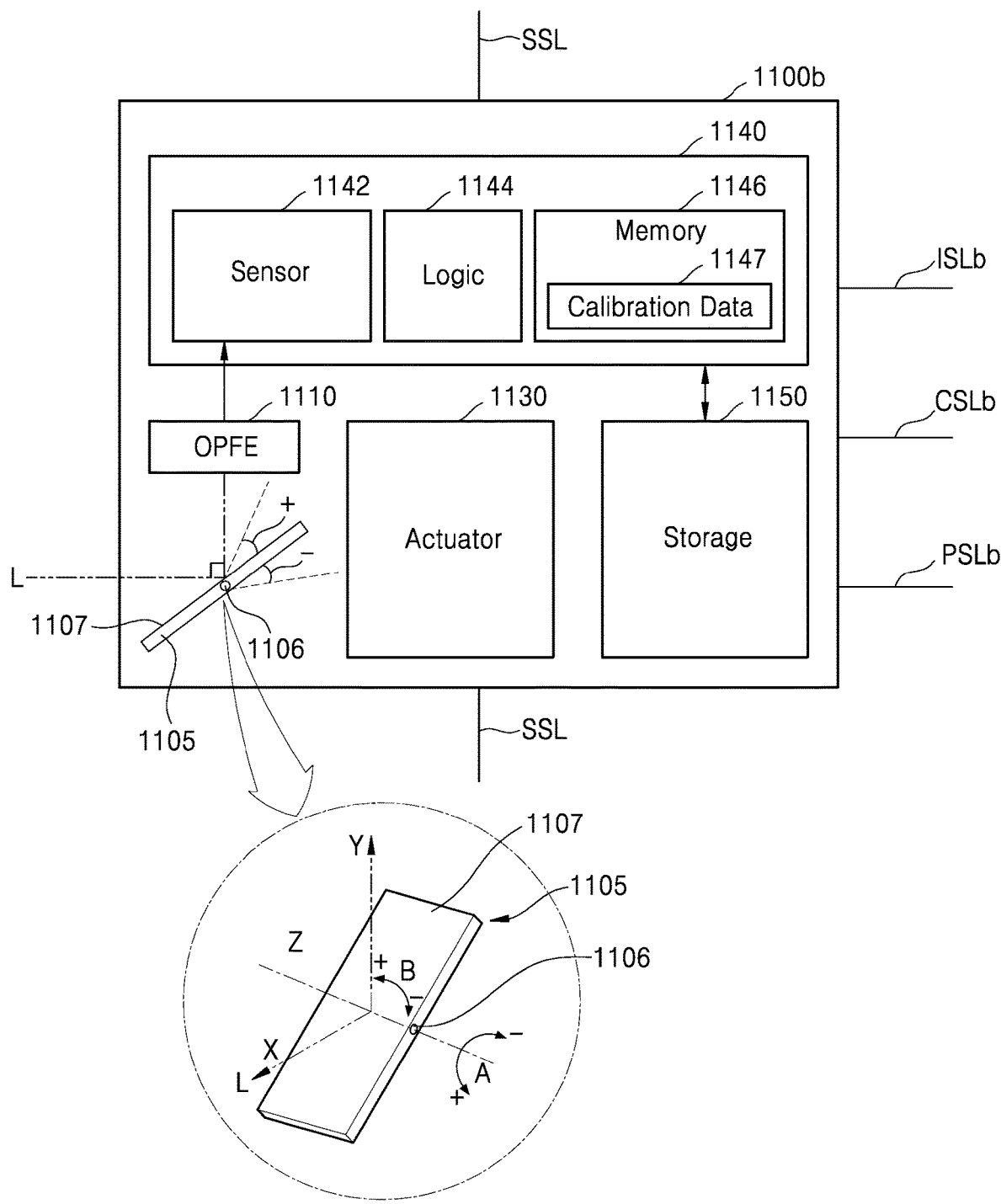
FIG. 9 is a detailed block diagram of the camera module of FIG. 8 according to an example embodiment of the inventive concept.

FIG. 8 is a block diagram of an electronic device including a multi-camera module according to an example embodiment of the inventive concept, and FIG. 9 is a detailed block diagram of the camera module of FIG. 8 according to an example embodiment of the inventive concept.

Referring to FIG. 8, an electronic device 1000 may include a camera module group 1100, an application processor 1200, a power management integrated circuit (PMIC) 1300, and a external memory 1400.

The camera module group 1100 may include a plurality of camera modules 1100a, 1100b, and 1100c. Although FIG. 8 shows an embodiment in which three camera modules 1100a, 1100b, and 1100c are disposed, the inventive concept is not limited thereto. In some embodiments of the inventive concept, the camera module group 1100 may be modified to include only two camera modules. In addition, in some embodiments of the inventive concept, the camera module group 1100 may be modified to include n (n is a natural number greater than or equal to 4) camera modules.

Hereinafter, a configuration of the camera module 1100b will be described in more detail with reference to FIG. 9, but the following description may be equally applied to the other camera modules 1100a and 1100b.

Referring to FIG. 9, the camera module 1100b may include a prism 1105, an optical path folding element (hereinafter, "OPFE") 1110, an actuator 1130, an image sensing device 1140, and a storage unit 1150.

The prism 1105 may include a reflective surface 1107 of a light reflective material to modify the path of light L incident from the outside.

In some embodiments of the inventive concept, the prism 1105 may change the path of the light L incident in a first direction X to a second direction Y perpendicular to the first direction X. In addition, the prism 1105 may change the path of the light L incident in the first direction X to the second direction Y perpendicular to the first direction X by rotating the reflective surface 1107 of the light reflective material in the A direction about a central axis 1106 or by rotating the central axis 1106 in the B direction. In this case, the OPFE 1110 may also move in a third direction Z perpendicular to the first direction X and the second direction Y.

In some embodiments of the inventive concept, as shown, the maximum rotation angle of the prism 1105 in the A direction may be 15 degrees or less in the positive (+) A direction and greater than 15 degrees in the negative (−) A direction, but the inventive concept is not limited thereto.

In some embodiments of the inventive concept, the prism 1105 may be moved in the positive (+) or negative (−) B direction around 20 degrees, or between 10 degrees and 20 degrees, or between 15 degrees and 20 degrees. Here, the moving angle may be moved at the same angle in the plus (+) or minus (−) direction B, or may move up to an almost similar angle within a range of about 1 degree.

In some embodiments of the inventive concept, the prism 1105 may move the reflective surface 1107 of the light reflective material in a third direction, for example, the Z direction, parallel to the extension direction of the central axis 1106.

The OPFE 1110 may include, for example, an optical lens consisting of m (here, m is a natural number) number of groups. The m lenses may move in the second direction Y to change an optical zoom ratio of the camera module 1100b. For example, assuming that the basic optical zoom ratio of the camera module 1100b is Z, when the m optical lenses included in the OPFE 1110 are moved, the optical zoom ratio of the camera module 1100b may be changed to an optical zoom ratio of 3Z or 5Z, or 5Z or more.

The actuator 1130 may move the OPFE 1110 or an optical lens (hereinafter, referred to as an optical lens) to a specific position. For example, the actuator 1130 may adjust the position of the optical lens so that an image sensor 1142 is located at a focal length of the optical lens for accurate sensing.

The image sensing device 1140 may include the image sensor 1142, a control logic 1144, and a memory 1146. The image sensor 1142 may sense an image of a sensing target using light L provided through an optical lens. The control logic 1144 may control the overall operation of the camera module 1100b. For example, the control logic 1144 may control the operation of the camera module 1100b depending on a control signal provided through a control signal line CSLb.

The memory 1146 may store information necessary for the operation of the camera module 1100b, such as calibration data 1147. The calibration data 1147 may include information necessary for the camera module 1100b to generate image data using the light L provided from the outside. The calibration data 1147 may include, for example, information about a degree of rotation, information about a focal length, and information about an optical axis, described above. When the camera module 1100b is implemented in the form of a multi-state camera in which the focal length is changed depending on the position of the optical lens, the calibration data 1147 may include a focal length value for each position (or state) of the optical lens and information related to auto focusing.

The storage unit 1150 may store image data sensed by the image sensor 1142. The storage unit 1150 may be disposed outside the image sensing device 1140, and may be implemented in a stacked form on a sensor chip constituting the image sensing device 1140. In some embodiments of the inventive concept, the storage unit 1150 may be implemented as an electrically erasable programmable read-only memory (EEPROM), but the inventive concept is not limited thereto.

Referring to FIGS. 8 and 9 together, in some embodiments of the inventive concept, each of the plurality of camera modules 1100a, 1100b, and 1100c may include the actuator 1130. Accordingly, each of the plurality of camera modules 1100a, 1100b, and 1100c may include the same or different calibration data 1147 depending on the operation of the actuator 1130 included therein.

In some embodiments of the inventive concept, one camera module (e.g., 1100b) among the plurality of camera modules 1100a, 1100b, and 1100c may be a folded lens type camera module including the prism 1105 and the OPFE 1110 described above, and the remaining camera modules (e.g., 1100a and 1100b) may be a vertical type camera module that does not include the prism 1105 and the OPFE 1110, but the inventive concept is not limited thereto.

In some embodiments of the inventive concept, one camera module (e.g., 1100c) among the plurality of camera modules 1100a, 1100b, and 1100c may be, for example, a vertical type depth camera for extracting depth information using infrared (IR) rays. In this case, the application processor 1200 may generate a three-dimensional (3D) depth image by merging the image data provided from the depth camera and the image data provided from another camera module (e.g., 1100a or 1100b).

In some embodiments of the inventive concept, at least two camera modules (e.g., 1100a, 1100b) among the plurality of camera modules 1100a, 1100b, and 1100c may have different fields of view from each other. In this case, for example, optical lenses of at least two camera modules (e.g., 1100a, 1100b) among the plurality of camera modules 1100a, 1100b, and 1100c may be different from each other, but the inventive concept is not limited thereto.

Also, in some embodiments of the inventive concept, a viewing angle of each of the plurality of camera modules 1100a, 1100b, and 1100c may be different from each other. In this case, the optical lenses included in each of the plurality of camera modules 1100a, 1100b, and 1100c may also be different, but is not limited thereto.

In some embodiments of the inventive concept, each of the plurality of camera modules 1100a, 1100b, and 1100c may be disposed to be physically separated from each other. In other words, an independent image sensor 1142 may be disposed inside each of the plurality of camera modules 1100a, 1100b, and 1100c, rather than using the sensing area of one image sensor 1142 by a plurality of camera modules 1100a, 1100b, and 1100c.

Referring back to FIG. 8, the application processor 1200 may include an image processor 1210, a memory controller 1220, and an internal memory 1230. The application processor 1200 may be implemented separately from the plurality of camera modules 1100a, 1100b, and 1100c. For example, the application processor 1200 and the plurality of camera modules 1100a, 1100b, and 1100c may be implemented separately as separate semiconductor chips.

The image processor 1210 may include a plurality of sub image processors 1212a, 1212b, and 1212c, an image generator 1214, and a camera module controller 1216.

The plurality of sub-image processors 1212a, 1212b, and 1212c may correspond to the number of the plurality of camera modules 1100a, 1100b, and 1100c.

Image data generated from each of the camera modules 1100a, 1100b, and 1100c may be provided to the corresponding sub-image processors 1212a, 1212b, and 1212c through image signal lines ISLa, ISLb, and ISLc separated from each other. For example, image data generated from the camera module 1100a may be provided to the sub-image processor 1212a through the image signal line ISLa, the image data generated from the camera module 1100b may be provided to the sub-image processor 1212b through the image signal line ISLb, and the image data generated from the camera module 1100c may be provided to the sub-image processor 1212c through the image signal line ISLc. Such image data transmission may be performed using, for example, a camera serial interface (CSI) based on a mobile industry processor interface (MIPI), but the inventive concept is not limited thereto.

In some embodiments of the inventive concept, one sub-image processor may be arranged to correspond to a plurality of camera modules. For example, the sub-image processor 1212a and the sub-image processor 1212c may not be implemented separately from each other as shown, but may be implemented by being integrated into one sub-image processor, and the image data provided from the camera module 1100a and the camera module 1100c may be selected through a selection device (e.g., a multiplexer) and then provided to the integrated sub-image processor.

The image data provided to each of the sub-image processors 1212a, 1212b, and 1212c may be provided to the image generator 1214. The image generator 1214 may generate an output image using image data provided from each of the sub-image processors 1212a, 1212b, and 1212c depending on image generating (or generation) information or a mode signal.

For example, the image generator 1214 may generate an output image by merging at least some of the image data generated from the camera modules 1100a, 1100b, and 1100c having different viewing angles depending on the image generation information or the mode signal. In addition, the image generator 1214 may generate an output image by selecting any one of image data generated from the camera modules 1100a, 1100b, and 1100c having different viewing angles depending on image generation information or a mode signal.

In some embodiments of the inventive concept, the image generation information may include a zoom signal or zoom factor. In addition, in some embodiments of the inventive concept, the mode signal may be, for example, a signal based on a mode selected by a user.

When the image generation information is a zoom signal (e.g., a zoom factor), and each camera module 1100a, 1100b, and 1100c has a different viewing field (e.g., viewing angle) from each other, the image generator 1214 may perform different operations depending on the type of the zoom signal. For example, when the zoom signal is the first signal, the image generator 1214 may merge the image data output from the camera module 1100a and the image data output from the camera module 1100c, and then may generate an output image by using the merged image signal and the image data output from the camera module 1100b not used for merging. If the zoom signal is a second signal different from the first signal, the image generator 1214 may generate an output image by selecting any one of image data output from each of the camera modules 1100a, 1100b, and 1100c without performing such image data merging. However, the inventive concept is not limited thereto, and a method of processing image data may be modified and implemented as needed.

In some embodiments of the inventive concept, the image generator 1214 may receive a plurality of image data having different exposure times from at least one of the plurality of sub-image processors 1212a, 1212b, and 1212c, and perform high dynamic range (HDR) processing on the plurality of image data. Through such processing, the image generator 1214 may generate merged image data having an increased dynamic range.

The camera module controller 1216 may provide a control signal to each of the camera modules 1100a, 1100b, and 1100c. The control signals generated from the camera module controller 1216 may be provided to the corresponding camera modules 1100a, 1100b, and 1100c through control signal lines CSLa, CSLb, and CSLc separated from each other.

Any one of the plurality of camera modules 1100a, 1100b, and 1100c may be designated as a master camera (e.g., 1100b) depending on image generation information including a zoom signal or a mode signal, and the remaining camera modules (e.g., 1100a and 1100c) may be designated as slave cameras. Such information may be included in the control signal and provided to the corresponding camera modules 1100a, 1100b, and 1100c through the control signal lines CSLa, CSLb, and CSLc separated from each other.

A camera module operating as a master and a slave may be changed depending on a zoom factor or an operation mode signal. For example, when the viewing angle of the camera module 1100a is wider than that of the camera module 1100b and the zoom factor indicates a low zoom ratio, the camera module 1100b may operate as a master, and the camera module 1100a may operate as a slave. Conversely, when the zoom factor indicates a high zoom ratio, the camera module 1100a may operate as a master and the camera module 1100b may operate as a slave.

In some embodiments of the inventive concept, the control signal provided from the camera module controller 1216 to each of the camera modules 1100a, 1100b, and 1100c may include a sync enable signal. For example, when the camera module 1100b is a master camera and the camera modules 1100a and 1100c are slave cameras, the camera module controller 1216 may transmit a sync enable signal to the camera module 1100b. The camera module 1100b receiving the sync enable signal may generate a sync signal based on the received sync enable signal, and may provide the generated sync signal to the camera modules 1100a and 1100c through a sync signal line SSL. The camera module 1100b and the camera modules 1100a and 1100c may be synchronized with the sync signal to transmit image data to the application processor 1200.

In some embodiments of the inventive concept, the control signal provided from the camera module controller 1216 to the plurality of camera modules 1100a, 1100b, and 1100c may include mode information depending on the mode signal. Based on the mode information, the plurality of camera modules 1100a, 1100b, and 1100c may operate in a first operation mode and a second operation mode in relation to the sensing rate.

In the first operation mode, the plurality of camera modules 1100a, 1100b, and 1100c may generate an image signal at a first rate, for example, an image signal at a first frame rate, encode the image signal at a second rate higher than the first rate, for example, the image signal at a second frame rate higher than the first frame rate, and transmit the encoded image signal to the application processor 1200. In this case, the second rate may be 30 times or less than the first rate.

The application processor 1200 may store the received image signal, in other words, the encoded image signal, in the memory 1230 provided therein or the external memory 1400 external to the application processor 1200, then read and decode the encoded image signal from the memory 1230 or the external memory 1400, and display image data generated based on the decoded image signal. For example, a corresponding sub-processor among the plurality of sub-processors 1212a, 1212b, and 1212c of the image processor 1210 may perform decoding, and may also perform image processing on the decoded image signal.

In the second operation mode, the plurality of camera modules 1100a, 1100b, and 1100c may generate an image signal at a third rate lower than the first rate, for example, an image signal at a third frame rate lower than the first frame rate, and transmit the image signal to the application processor 1200. The image signal provided to the application processor 1200 may be an unencoded signal. The application processor 1200 may perform image processing on the received image signal or store the image signal in the memory 1230 or the external memory 1400.

The PMIC 1300 may supply power, for example, a power supply voltage, to each of the plurality of camera modules 1100a, 1100b, and 1100c. For example, the PMIC 1300 may supply a first power to the camera module 1100a through a power signal line PSLa, supply a second power to the camera module 1100b through a power signal line PSLb, and supply a third power to the camera module 1100c through a power signal line PSLc, under the control of the application processor 1200.

The PMIC 1300 may generate power corresponding to each of the plurality of camera modules 1100a, 1100b, and 1100c in response to a power control signal PCON from the application processor 1200, and also adjust the power level. The power control signal PCON may include a power adjustment signal for each operation mode of the plurality of camera modules 1100a, 1100b, and 1100c. For example, the operation mode may include a low power mode, and in this case, the power control signal PCON may include information about a camera module operating in the low power mode and a set power level. The levels of powers provided to each of the plurality of camera modules 1100a, 1100b, and 1100c may be the same or different from each other. In addition, the level of power may be changed dynamically.

While the inventive concept has been particularly shown and described with reference to example embodiments thereof, it will be understood that various changes in form and details may be made thereto without departing from the spirit and scope of the inventive concept as set forth in the following claims.

What is claimed is:

1. An image sensor supporting a full resolution mode and a crop mode, the image sensor comprising:
   a pixel array including a plurality of pixels configured to generate a pixel signal by sensing an object;
   an analog-to-digital converter configured to convert the pixel signal into a digital signal and including a plurality of metal lines;
   a bias generator configured to apply a bias voltage to the plurality of metal lines; and
   a bias controller configured to determine a path through which the bias voltage is applied to the metal line, wherein the bias controller comprises
   a first transistor configured to activate all of the plurality of metal lines based on a first control signal; and
   a second transistor configured to activate a first metal line for the crop mode among the plurality of metal lines based on a second control signal.

2. The image sensor of claim 1, further comprising: a first switch between the first transistor and the second transistor.

3. The image sensor of claim 2, wherein the full resolution mode corresponds to an inactive state of the first transistor and the second transistor, and a short circuit state of the first switch.

4. The image sensor of claim 2, wherein the crop mode corresponds to an inactive state of the first transistor, an active state of the second transistor, and an open state of the first switch.

5. The image sensor of claim 2, wherein the image sensor further supports a power saving mode,
   wherein the power saving mode is an active state of the first transistor, and corresponds to either an active state of the second transistor or a short circuit state of the first switch.

6. The image sensor of claim 1, wherein the first transistor and the second transistor include N-type metal oxide semiconductor field effect transistors (MOSFETs).

7. The image sensor of claim 1, wherein, in the full resolution mode, both the first control signal and the second control signal are at a first logic level.

8. The image sensor of claim 1, wherein, in the crop mode, the first control signal is at a first logic level, and the second control signal is at a second logic level that is opposite in phase to the first logic level.

9. The image sensor of claim 1, wherein, in the full resolution mode, the bias voltage is applied to all of the plurality of metal lines.

10. The image sensor of claim 1, wherein, in the crop mode, the bias voltage is provided to the first metal line, and
a ground voltage is provided to the rest of metal lines except the first metal line among the plurality of metal lines.

11. The image sensor of claim 1, wherein the image sensor further supports a power saving mode,
wherein, in the power saving mode, a ground voltage is applied to all of the plurality of metal lines.

12. An analog-to-digital converter configured to convert a pixel signal sensed at a pixel into a digital signal, the analog-to-digital converter comprising:
a comparator including a first metal line and a second metal line that are activated depending on a bias voltage, the comparator being configured to generate a comparison signal by comparing the pixel signal with a ramp signal based on the bias voltage;
a counter configured to generate a digital signal by counting the comparison signal based on a clock signal; and
a bias controller including a first transistor and a second transistor and configured to determine whether to apply the bias voltage to at least one of the first metal line and the second metal line.

13. The analog-to-digital converter of claim 12, wherein the first transistor is configured to determine whether the bias voltage is applied to the first metal line and the second metal line.

14. The analog-to-digital converter of claim 12, wherein the analog-to-digital converter is configured to support a crop mode for activating at least one of the first metal line and the second metal line, and
the first transistor is configured to determine whether the bias voltage is applied to the first metal line for the crop mode.

15. The analog-to-digital converter of claim 14, wherein, in the crop mode, a first control signal for controlling the first transistor is at a first logic level, and a second control signal for controlling the second transistor is at a second logic level that is opposite in phase to the first logic level.

16. The analog-to-digital converter of claim 12, further comprising:
a first switch between the first transistor and the second transistor.

17. The analog-to-digital converter of claim 16, wherein the analog-to-digital converter supports a crop mode for activating at least one of the first metal line and the second metal line, and
the crop mode corresponds to an inactive state of the first transistor, an active state of the second transistor, and an open state of the first switch.

18. The analog-to-digital converter of claim 16, wherein the analog-to-digital converter supports a power saving mode for deactivating the first metal line and the second metal line, and
the power saving mode corresponds to any two states of an active state of the first transistor, an active state of the second transistor, and a short circuit state of the first switch.

19. The analog-to-digital converter of claim 12, wherein the analog-to-digital converter supports a crop mode for activating at least one of the first metal line and the second metal line, and
in the crop mode, the bias voltage is provided to the first metal line, and
a ground voltage is provided to the second metal line.

20. An image sensor supporting a full resolution mode and a crop mode, the image sensor comprising:
a pixel array including a plurality of pixels configured to generate a pixel signal by sensing an object;
an analog-to-digital converting array including a plurality of analog-to-digital converters each configured to convert the pixel signal into a digital signal, the analog-to-digital converting array including a plurality of metal lines commonly connected to the plurality of analog-to-digital converters;
a bias generator configured to apply a bias voltage to the plurality of metal lines; and
a bias controller configured to determine a path through which the bias voltage is applied to the metal lines, wherein the bias controller comprises a first transistor configured to activate all of the plurality of metal lines based on a first control signal;
a second transistor configured to activate a first metal line for the crop mode among the plurality of metal lines based on a second control signal; and
an output buffer configured to output the digital signal.

* * * * *